(12) United States Patent
Xu et al.

(10) Patent No.: US 12,713,147 B2
(45) Date of Patent: Aug. 18, 2026

(54) CIRCUIT AND METHOD FOR SAMPLING IMAGING SIGNAL

(71) Applicants: Chongqing GigaChip Technology Co., Ltd., Chongqing (CN); NO.24 RESEARCH INSTITUTE OF CHINA ELECTRONICS TECHNOLOGY GROUP CORPORATION, Chongqing (CN)

(72) Inventors: Daiguo Xu, Chongqing (CN); Xuebing Li, Chongqing (CN); Xingbing Wu, Chongqing (CN); Dongbing Fu, Chongqing (CN); Jianan Wang, Chongqing (CN); Guangbing Chen, Chongqing (CN); Zhou Yu, Chongqing (CN); Zhengping Zhang, Chongqing (CN); Can Zhu, Chongqing (CN); Weiqi Gao, Chongqing (CN); Haiyang Yu, Chongqing (CN)

(73) Assignees: Chongqing GigaChip Technology Co., Ltd., Chongqing (CN); NO.24 RESEARCH INSTITUTE OF CHINA ELECTRONICS TECHNOLOGY GROUP CORPORATION, Chongqing (CN)

( * ) Notice: Subject to any disclaimer, the term of this patent is extended or adjusted under 35 U.S.C. 154(b) by 37 days.

(21) Appl. No.: 19/026,249

(22) Filed: Jan. 16, 2025

(65) Prior Publication Data

US 2025/0274678 A1 Aug. 28, 2025

Related U.S. Application Data

(63) Continuation of application No. PCT/CN2024/081606, filed on Mar. 14, 2024.

(30) Foreign Application Priority Data

Feb. 26, 2024 (CN) ........................ 202410206531.X

(51) Int. Cl.
*H04N 25/616* (2023.01)
*H04N 25/71* (2023.01)

(52) U.S. Cl.
CPC ........... *H04N 25/616* (2023.01); *H04N 25/71* (2023.01)

(58) Field of Classification Search
CPC ............................. H04N 25/616; H04N 25/71
See application file for complete search history.

(56) References Cited

U.S. PATENT DOCUMENTS 5,872,470 A * 2/1999 Mallinson ............ G11C 27/026 327/95
6,777,660 B1 * 8/2004 Lee ........................ H04N 25/77 348/E5.079

(Continued)

*Primary Examiner* — Chiawei Chen

(57) ABSTRACT

The present application provides a circuit and a method for sampling an imaging signal, the circuit includes: a first sampling module sampling the imaging signal N times under the control of N first sampling signals and a second sampling signal to obtain 2N reset voltages; and a second sampling module sampling the imaging signal N times under the control of N third sampling signals and a fourth sampling signal to obtain 2N signal voltages; in each cycle of the imaging signal, when the imaging signal is sampled, the amplification module is controlled by the reset signal to perform a reset operation, and after sampling, the 2N reset voltages and the 2N signal voltages are differentially amplified 2N−1 times in sequence to obtain 2N−1 sampling signals.

16 Claims, 9 Drawing Sheets

(56) References Cited

U.S. PATENT DOCUMENTS

| | | | | |
|---|---|---|---|---|
| 6,873,364 | B1 * | 3/2005 | Krymski | G11C 27/024 348/E5.079 |
| 8,106,987 | B1 * | 1/2012 | Vu | H04N 25/616 348/241 |
| 8,514,306 | B2 * | 8/2013 | Jung | H04N 25/78 348/255 |
| 9,998,698 | B1 * | 6/2018 | Xue | H04N 25/77 |
| 10,715,359 | B1 * | 7/2020 | Liu | H04L 25/03057 |
| 11,804,806 | B2 * | 10/2023 | Huang | H03F 3/45475 |
| 2010/0110248 | A1 * | 5/2010 | Chou | H04N 25/616 348/E3.016 |
| 2018/0184026 | A1 * | 6/2018 | Kato | H04N 25/677 |
| 2020/0084405 | A1 * | 3/2020 | Tseng | G11C 27/026 |

* cited by examiner

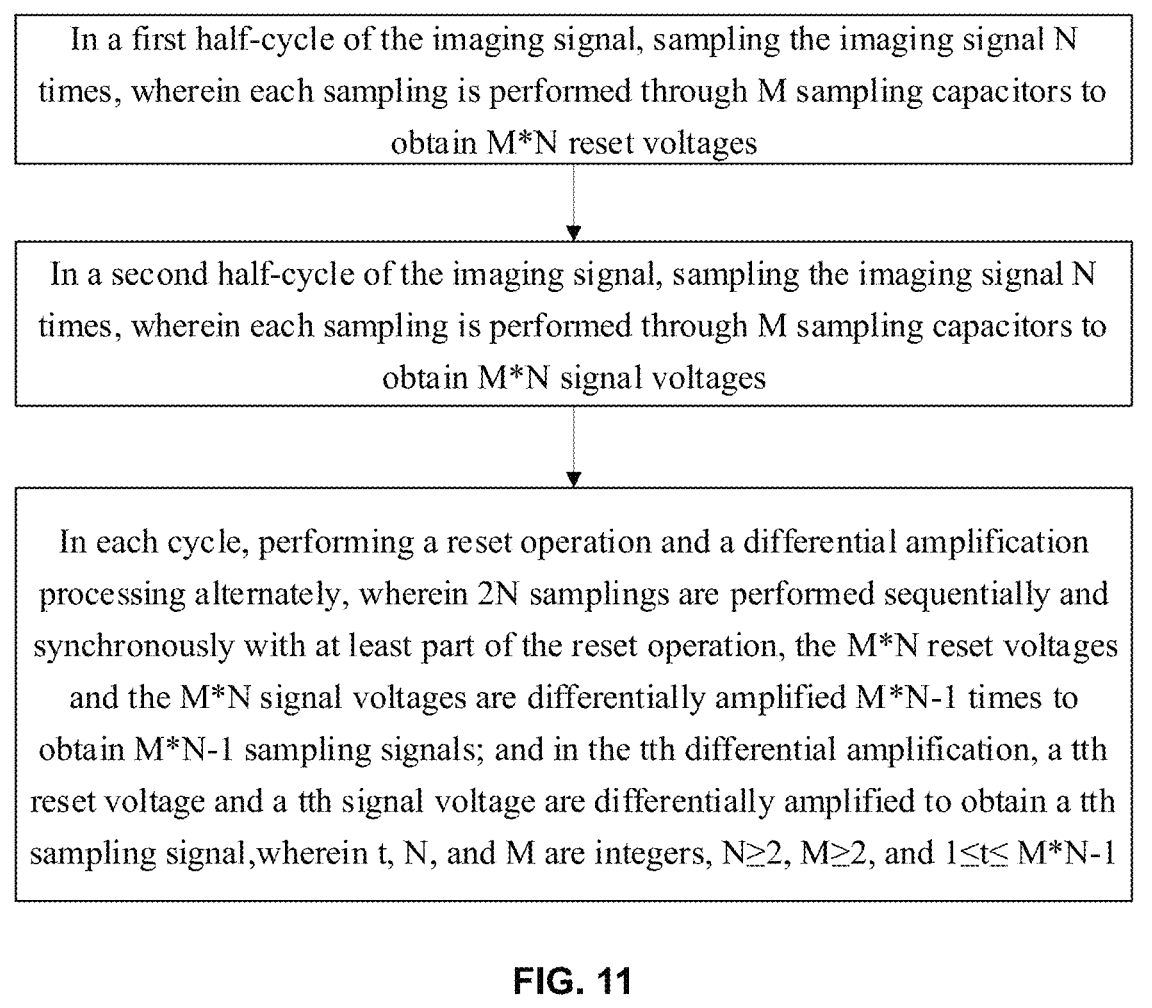

In a first half-cycle of the imaging signal, sampling the imaging signal N times, wherein each sampling is performed through M sampling capacitors to obtain M*N reset voltages

↓

In a second half-cycle of the imaging signal, sampling the imaging signal N times, wherein each sampling is performed through M sampling capacitors to obtain M*N signal voltages

↓

In each cycle, performing a reset operation and a differential amplification processing alternately, wherein 2N samplings are performed sequentially and synchronously with at least part of the reset operation, the M*N reset voltages and the M*N signal voltages are differentially amplified M*N-1 times to obtain M*N-1 sampling signals; and in the tth differential amplification, a tth reset voltage and a tth signal voltage are differentially amplified to obtain a tth sampling signal,wherein t, N, and M are integers, $N \geq 2$, $M \geq 2$, and $1 \leq t \leq M*N-1$

FIG. 11

CIRCUIT AND METHOD FOR SAMPLING IMAGING SIGNAL

CROSS REFERENCE TO RELATED APPLICATION

The present disclosure is a continuation application of International Patent Application No. PCT/CN2024/081606, filed on Mar. 14, 2024, which claims the priority to Chinese Application No. 202410206531.X, filed on Feb. 26, 2024, the contents of all of which are incorporated herein by reference in their entirety for all purposes.

TECHNICAL FIELD

The present application relates to the technical field of analog integrated circuits, and in particular to a circuit and a method for sampling an imaging signal.

BACKGROUND

CCD (Charge-Coupled Device) is an image sensor that converts light signals into electrical signals through photoelectric conversion. As a mature imaging technology, CCD is widely used. It is characterized by high imaging quality, high sensitivity, low noise, fast response, and high resolution, as well as high pixel integration and precise size. It has a wide range of applications in astronomy, medical imaging equipment, microscope images, optical recognition, and other fields. In related technologies, the sampling circuit of traditional imaging signals mainly amplifies the reset level and the signal level of the imaging signal every time a sampling is completed.

SUMMARY

According to one aspect of an embodiment of the present application, a circuit for sampling an imaging signal is provided. The circuit includes: a first sampling module connected to an imaging signal, a first reference voltage, N first sampling signals, and a second sampling signal, and sampling the imaging signal N times based on the first reference voltage under the control of the N first sampling signals and the second sampling signal to obtain 2N reset voltages; a second sampling module connected to the imaging signal, the first reference voltage, N third sampling signals, and a fourth sampling signal, and sampling the imaging signal N times based on the first reference voltage under the control of the N third sampling signals and the fourth sampling signal to obtain 2N signal voltages; and an amplification module connected to the first sampling module, the second sampling module, 2N−1 differential connection signals, a first amplifying signal, a second amplifying signal, and a reset signal, wherein in each cycle of the imaging signal, the amplification module alternately performs a reset operation and a differential amplification process; when the reset signal controls the amplification module to perform the reset operation, the first sampling module or the second sampling module is synchronously controlled to sample the imaging signal; after the sampling is completed, under the control of the 2N−1 differential connection signals, the first amplifying signal, and the second amplifying signal, 2N reset voltages and 2N signal voltages are differentially amplified 2N−1 times in sequence to obtain 2N−1 sampling signals; during an ith amplification, the ith reset voltage and the ith signal voltage are differentially amplified to obtain the ith sampling signal, wherein, i and N are integers, N≥2, and 1≤i≤2N−1.

In an embodiment of the present application, the first sampling module includes 2N reset sampling units and a first reference unit; the reset sampling unit is connected to the first sampling signal and samples the imaging signal based on the first sampling signal to obtain the reset voltage; and the first reference unit is connected to the reset sampling unit, the first reference voltage, and the second sampling signal, and uses the first reference voltage as a reference value of the reset sampling unit based on the second sampling signal.

In an embodiment of the present application, the reset sampling unit includes a first sampling switch and a first sampling capacitor, one end of the first sampling switch is connected to the imaging signal, the other end of the first sampling switch is connected to one end of the first sampling capacitor, and a control end of the first sampling switch is connected to the first sampling signal; and the first reference unit includes a second sampling switch, one end of the second sampling switch is connected to the other end of the first sampling capacitor, the other end of the second sampling switch is connected to the first reference voltage, and a control end of the second sampling switch is connected to the second sampling signal.

In an embodiment of the present application, the second sampling module includes 2N signal sampling units and a second reference unit; the signal sampling unit is connected to a third sampling signal and samples the imaging signal based on the third sampling signal to obtain the signal voltage; and the second reference unit is connected to the signal sampling unit, the first reference voltage, and the fourth sampling signal, and uses the first reference voltage as a reference value of the signal sampling unit based on the fourth sampling signal.

In an embodiment of the present application, the signal sampling unit includes a third sampling switch and a second sampling capacitor, one end of the third sampling switch is connected to the imaging signal, the other end of the third sampling switch is connected to one end of the second sampling capacitor, and a control end of the third sampling switch is connected to the third sampling signal; and the second reference unit includes a fourth sampling switch, one end of the fourth sampling switch is connected to the other end of the second sampling capacitor, the other end of the fourth sampling switch is connected to the first reference voltage, and a control end of the fourth sampling switch is connected to the fourth sampling signal.

In an embodiment of the present application, the amplification module includes a differential processing unit and an amplification unit; the differential processing unit is connected to 2N−1 differential connection signals and the first amplifying signal and connects 2N reset voltages and 2N signal voltages in a one-to-one correspondence under the control of the 2N−1 differential connection signals and the first amplifying signal to obtain 2N−1 differential signals; the amplification unit is connected to the differential processing unit, the second amplifying signal, and the reset signal; when the reset signal controls the amplification unit to perform a reset operation, the first sampling module or the second sampling module is synchronously controlled to sample the imaging signal; and after the sampling is completed, under the control of the second amplifying signal, the 2N−1 differential signals are amplified sequentially to obtain 2N−1 sampling signals.

In an embodiment of the present application, the differential processing unit includes 2N−1 differential connection switches, a first amplifying switch, and a second amplifying switch; and one end of the ith differential connection switch is connected to one end of the ith first sampling capacitor, the other end of the ith first sampling capacitor is connected to one end of the first amplifying switch, the other end of the ith differential connection switch is connected to one end of the ith second sampling capacitor, the other end of the ith second sampling capacitor is connected to one end of the second amplifying switch, a control end of the ith differential connection switch is connected to the ith differential connection signal, a control end of the first amplifying switch and a control end of the second amplifying switch are connected to the first amplifying signal, the other end of the first amplifying switch is a first output end of the differential processing unit, and the other end of the second amplifying switch is a second output end of the differential processing unit.

In an embodiment of the present application, the amplification unit includes a first reset switch, a second reset switch, a third reset switch, a fourth reset switch, a fifth reset switch, a sixth reset switch, a third amplifying switch, a fourth amplifying switch, a fifth amplifying switch, a sixth amplifying switch, a first feedback capacitor, a second feedback capacitor, and an operational amplifier; one end of the first reset switch is connected to a non-inverting input end of the operational amplifier, the other end of the first reset switch is connected to an inverting input end of the operational amplifier, the non-inverting input end of the operational amplifier is connected to an inverting output end of the operational amplifier via the third amplifying switch, the first feedback capacitor, and the fourth amplifying switch connected in series sequentially, the inverting input end of the operational amplifier is connected to a non-inverting output end of the operational amplifier via the fifth amplifying switch, the second feedback capacitor, and the sixth amplifying switch connected in series sequentially, the inverting output end of the operational amplifier is connected to the non-inverting output end of the operational amplifier via the second reset switch connected in series; the second reference voltage is connected to one end of the first feedback capacitor via the third reset switch connected in series, the third reference voltage is connected to the other end of the first feedback capacitor via the fourth reset switch connected in series, the second reference voltage is connected to one end of the second feedback capacitor via the fifth reset switch connected in series, the fourth reference voltage is connected to the other end of the second feedback capacitor via the sixth reset switch connected in series; a control end of the first reset switch, a control end of the second reset switch, a control end of the third reset switch, a control end of the fourth reset switch, a control end of the fifth reset switch, and a control end of the sixth reset switch are connected to the reset signal; and a control end of the third amplifying switch, a control end of the fourth amplifying switch, a control end of the fifth amplifying switch, and a control end of the sixth amplifying switch are connected to the second amplifying signal; and the non-inverting input end of the operational amplifier is connected to the first output end of the differential processing unit, the inverting input end of the operational amplifier is connected to the second output end of the differential processing unit, and the non-inverting output end of the operational amplifier and the inverting output end of the operational amplifier cooperate to output the sampling signal.

According to another aspect of an embodiment of the present application, a method for sampling an imaging signal is also provided, which is applied to the circuit for sampling an imaging signal as described above and includes: in a first half-cycle of the imaging signal, sampling the imaging signal N times, wherein each sampling is performed through M sampling capacitors to obtain M*N reset voltages; in a second half-cycle of the imaging signal, sampling the imaging signal N times, wherein each sampling is performed through M sampling capacitors to obtain M*N signal voltages; and in each cycle, performing a reset operation and a differential amplification processing alternately, wherein 2N samplings are performed sequentially and synchronously with at least part of the reset operation, the M*N reset voltages and the M*N signal voltages are differentially amplified M*N−1 times to obtain M*N−1 sampling signals; and in the tth differential amplification, a tth reset voltage and a tth signal voltage are differentially amplified to obtain a tth sampling signal, wherein t, N, and M are integers, $N \geq 2$, $M \geq 2$, and $1 \leq t \leq M*N-1$.

It is to be understood that the foregoing general description and the following detailed description are exemplary and explanatory only and are not restrictive of the application.

BRIEF DESCRIPTION OF DRAWINGS

FIG. 11 shows a method for sampling an imaging signal according to an embodiment of the present application.

DESCRIPTION OF EMBODIMENTS

The following will describe the embodiments of the present application with reference to the accompanying drawings and preferred embodiments. Those skilled in the art can easily understand other advantages and effects of the present application from the contents disclosed in this specification. The present application can also be implemented or applied through other different specific embodiments, and the details in this specification can also be modified or changed in various ways based on different viewpoints and applications without departing from the spirit of the present application. It should be understood that the preferred embodiments are only for illustrating the present application, not for limiting the scope of protection of the present application.

It should be noted that the illustrations provided in the following embodiments are only schematic illustrations of the basic concept of the present application, and thus the drawings only show components related to the present application rather than being drawn according to the number, shape, and size of components in actual implementation. In actual implementation, the type, quantity, and proportion of each component may be changed arbitrarily, and the component layout may also be more complicated.

In the following description, numerous details are discussed to provide a more thorough explanation of the embodiments of the present application. However, it is obvious to those skilled in the art that the embodiments of the present application can be implemented without these specific details. In other embodiments, well-known structures and devices are shown in the form of block diagrams rather than in detail to avoid making the embodiments of the present application difficult to understand.

As a mature imaging technology, CCD (Charge-Coupled Device) imaging technology is widely used. It is characterized by high imaging quality, high sensitivity, low noise, fast response, and high resolution, as well as high pixel integration and precise size. It is widely used in astronomy, medical imaging equipment, microscope images, optical recognition, and other fields. These characteristics make CCD imaging a commonly used image sensor in the field of machine vision.

There is noise in the imaging signal, and the sampling circuit of the traditional imaging signal has a weak ability to suppress noise. Although the noise can be reduced by increasing the sampling capacitor, the area of the chip will also increase accordingly. Due to differences in integrated circuit processes, the traditional circuit for sampling an imaging signal will output a sampling signal with an offset error.

Therefore, how to provide a circuit for sampling an imaging signal that has strong noise suppression capability and can reduce offset errors is a technical problem that urgently needs to be solved.

Figure 1:
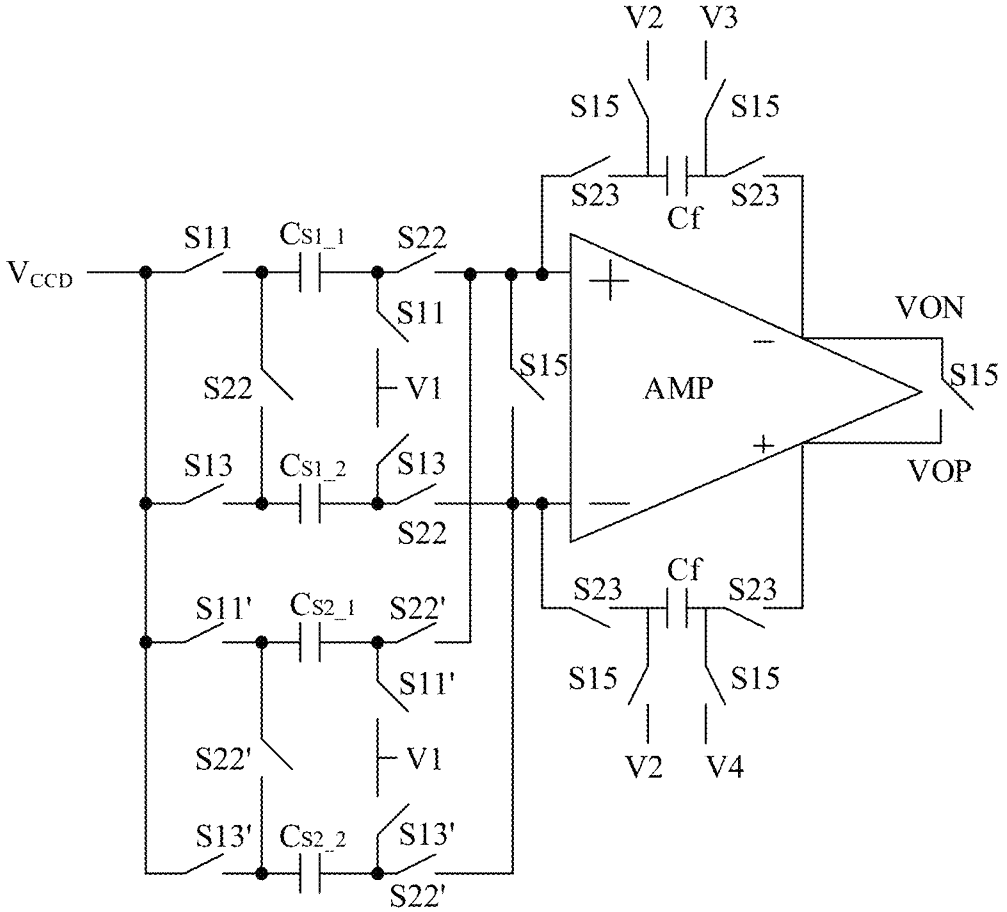
FIG. 1 is a specific structure of a circuit for sampling an imaging signal shown in an exemplary embodiment of the present application.

Please refer to FIG. 1, which shows a specific structure of a circuit for sampling an imaging signal according to an exemplary embodiment of the present application.

Figure 2:
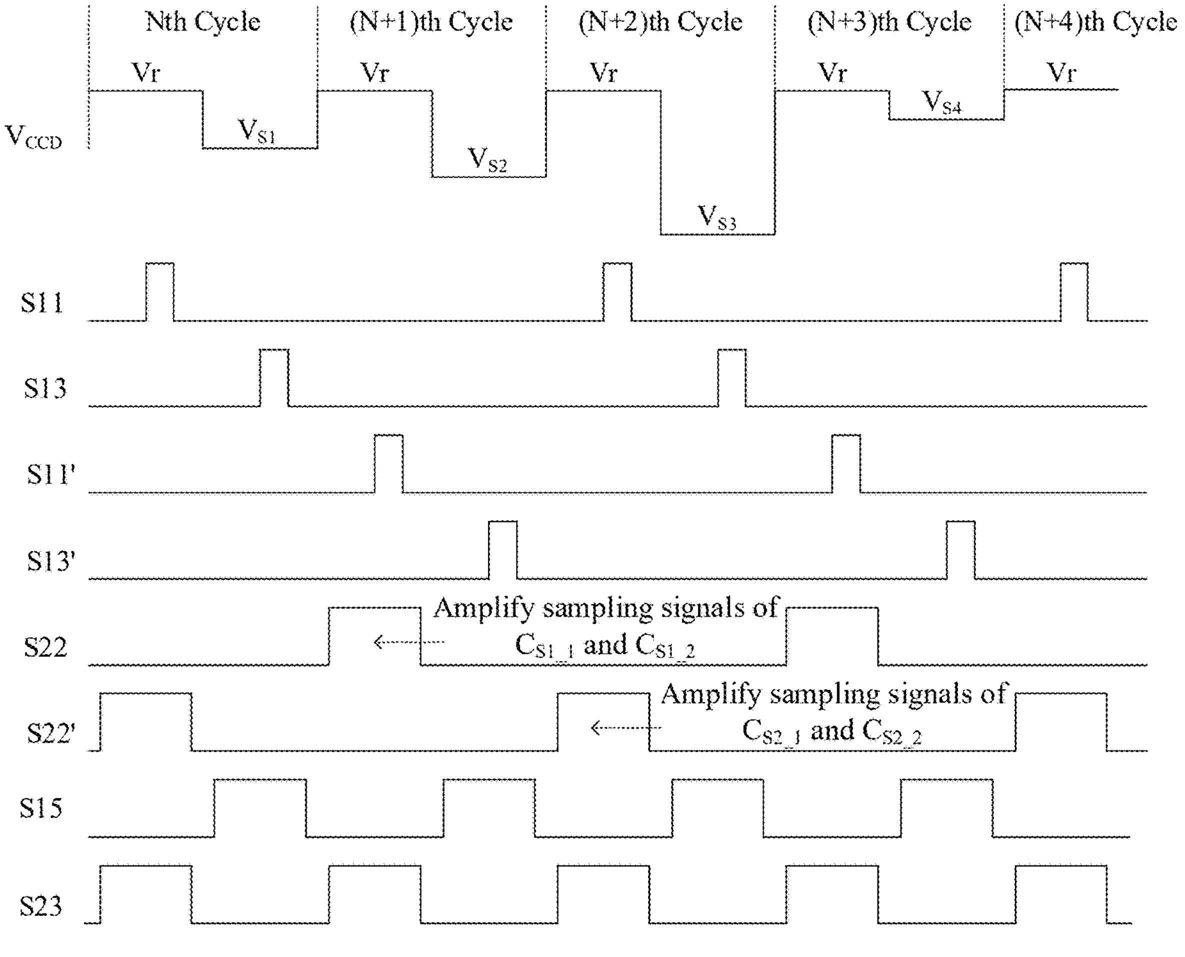
FIG. 2 is a timing diagram of a circuit for sampling an imaging signal shown in an exemplary embodiment of the present application.

Please refer to FIG. 2, which is a timing diagram of a circuit for sampling an imaging signal according to an exemplary embodiment of the present application.

Figure 3:
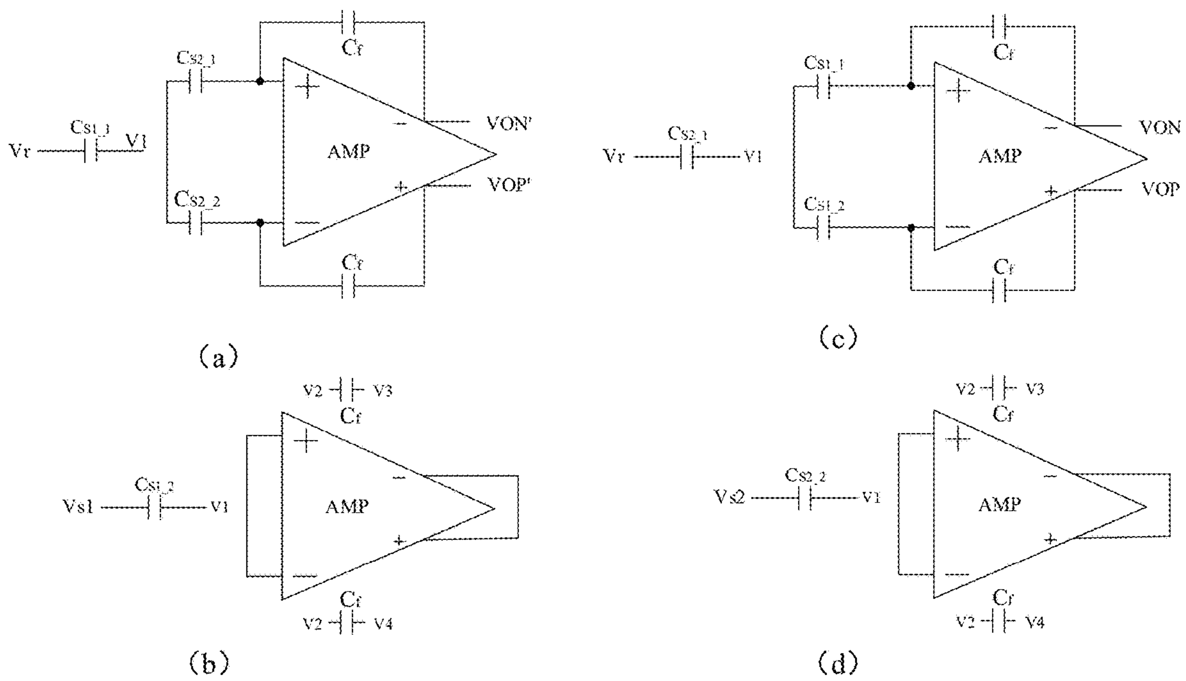
FIG. 3 is an exploded view of sampling and differential amplification of a circuit for sampling an imaging signal shown in an exemplary embodiment of the present application.

Please refer to FIG. 3, which is an exploded diagram of sampling and differential amplification of a circuit for sampling an imaging signal according to an exemplary embodiment of the present application.

As shown in FIG. 1, a circuit for sampling an imaging signal includes a first sampling network and a second sampling network. The first sampling network includes switches S11, S13, S15, S22, S23 and sampling capacitors CS1_1 and CS1_2. The second sampling network includes switches S11', S13', S15, S22', S23 and sampling capacitors CS2_1 and CS2_2. Cf is a feedback capacitor, and the operational amplifier AMP is an amplifier for the sampling signal. As shown in FIG. 1 and FIG. 2, when the imaging signal VCCD is in the Nth cycle, the imaging signal VCCD is in the first state, that is, when the value of the imaging signal VCCD is the reset level Vr, sampling is performed through the first group of sampling networks, the switch S11 is turned on by the signal K11, and the first sampling capacitor CS1_1 samples the imaging signal VCCD. At the same time, the switch S22' is turned on by the signal K22', and the switch S23 is turned on by the signal K23. The operational amplifier AMP amplifies the imaging signal VCCD sampled in the previous cycle, and the output voltage of the operational amplifier AMP is VOP'-VON'. The equivalent circuit diagram of the circuit for sampling an imaging signal sampling the first state of the imaging signal VCCD is shown in FIG. 3 (*a*).

Secondly, when the imaging signal VCCD is in the second state, that is, when the value of the imaging signal VCCD is the signal level VS1, the switch S13 is turned on by the signal K13, the second sampling capacitor CS1_2 samples the signal level VS1 of the imaging signal VCCD, the switch S15 is turned on by the signal K15, and the operational amplifier AMP is in the reset state. The equivalent circuit diagram of the circuit for sampling an imaging signal in the reset state is shown in FIG. 3(*b*). At this time, the first sampling capacitor CS1_1 and the second sampling capacitor CS2_1 respectively complete the sampling of the reset level Vr and the signal level VS1 of the imaging signal.

Next, when the imaging signal VCCD is in the (N+1)th cycle, the imaging signal VCCD is in the first state, that is, when the value of the imaging signal VCCD is the reset level Vr, the switch S11' is turned on by the signal K11', the third sampling capacitor CS2_1 samples the reset level Vr of the imaging signal VCCD, the switch S22 is turned on by the signal K22, the switch S23 is turned on by the signal K23, the operational amplifier AMP differentially amplifies the reset level and the signal level sampled in the Nth cycle, and the output voltage of the operational amplifier AMP is VOP-VON. The equivalent circuit diagram of the circuit for sampling an imaging signal sampling the first state of the imaging signal VCCD is shown in FIG. 3(*c*).

Then, when the imaging signal VCCD is in the second state, that is, when the value of the imaging signal VCCD is the signal level VS2, the switch S13' is turned on by the signal K13', the fourth sampling capacitor CS2_2 samples the signal level VS2 of the imaging signal VCCD, the switch S15 is turned on by the signal K15, and the operational amplifier AMP is in the reset state. The equivalent circuit diagram of the circuit for sampling an imaging signal in the reset state is shown in FIG. 3(*d*).

It can be seen from the previously mentioned circuit for sampling an imaging signal that this circuit for sampling an imaging signal performs amplification after completing a single sampling for each state of the imaging signal. Therefore, there are two main problems. Because the imaging signal itself has noise, the above-mentioned circuit for sampling an imaging signal has a relatively weak noise suppression ability for the imaging signal. If the noise of the imaging signal sampling device is to be reduced, it is necessary to have more sampling capacitors, which will increase the chip area. In addition, the operational amplifier AMP and the subsequent quantized analog-to-digital converter both have noise, and the previously mentioned circuit for sampling an imaging signal cannot suppress the noise brought by the operational amplifier AMP and the subsequent quantized analog-to-digital converter. Because the first group of sampling networks composed of the switches S11, S13, S15, S22, S23 and the sampling capacitors CS1_1 and CS1_2 and the second group of sampling networks composed of the switches S11', S13', S15, S22', S23 and the sampling capacitors CS2_1 and CS2_2 are used, due to the errors in the integrated circuit manufacturing process, there is a mismatch between the two groups of sampling networks. As a result, the sampling signal obtained by the operational amplifier AMP in the amplified state has an inherent offset error.

Figure 4:
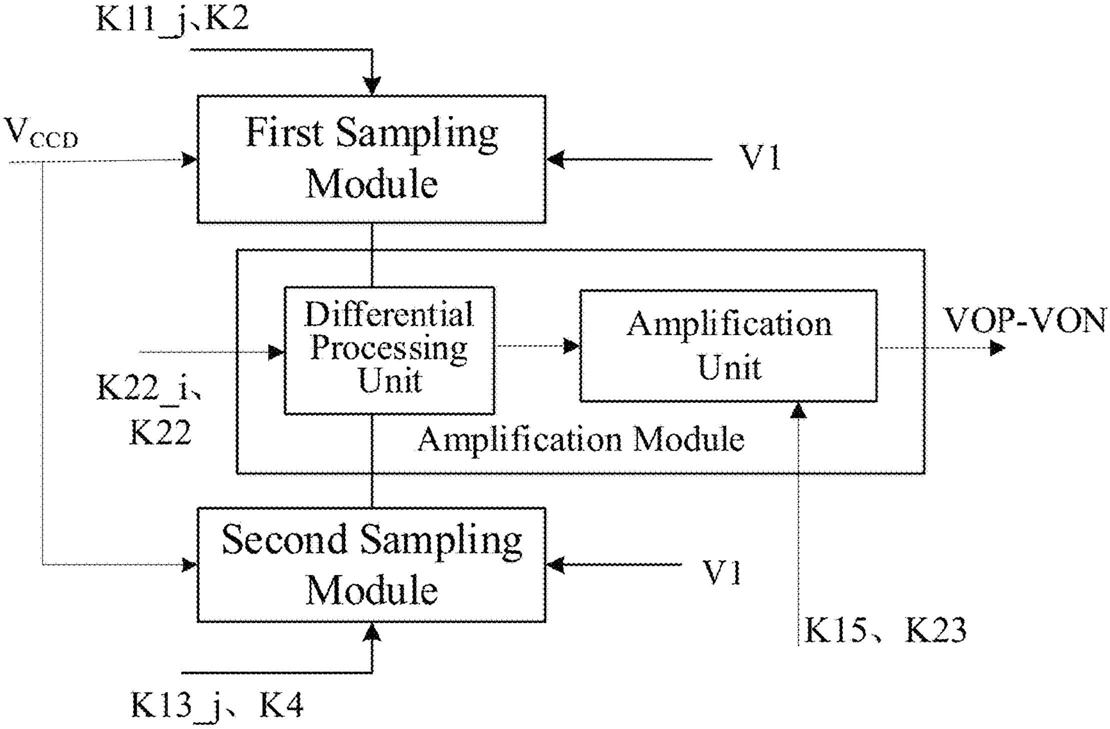
FIG. 4 is a block diagram of a circuit for sampling an imaging signal according to an exemplary embodiment of the present application.

Please refer to FIG. 4, which is a block diagram of a circuit for sampling an imaging signal according to an exemplary embodiment of the present application.

As shown in FIG. 4, in an exemplary embodiment, a circuit for sampling an imaging signal includes: a first sampling module connected to an imaging signal VCCD, a first reference voltage V1, N first sampling signals K11_j, and a second sampling signal K2, wherein under the control of the N first sampling signals K11_j and the second sampling signal K2, the imaging signal VCCD is sampled N times based on the first reference voltage V1 to obtain 2N reset voltages; a second sampling module connected to the imaging signal VCCD, the first reference voltage V1, N third sampling signals K13_j, and a fourth sampling signal K4, wherein under the control of the N third sampling signals K13_j and the fourth sampling signal K4, the imaging signal VCCD is sampled N times based on the first reference voltage V1 to obtain 2N signal voltages; an amplification module connected to the first sampling module, the second sampling module, 2N−1 differential connection signals K22_i, the first amplifying signal K22, the second amplifying signal K23, and the reset signal K15, wherein in each cycle of the imaging signal, the amplification module alternately performs a reset operation and a differential amplification process; when the reset signal K15 controls the amplification module to perform a reset operation, the first sampling module or the second sampling module is synchronously controlled to sample the imaging signal VCCD; after the sampling is completed, under the control of the 2N−1 differential connection signals K22_i, the first amplifying signal K22, and the second amplifying signal K23, 2N reset voltages and 2N signal voltages are differentially amplified 2N−1 times in sequence to obtain 2N−1 sampling signals; during the ith amplification, the ith reset voltage and the ith signal voltage are differentially amplified to obtain the ith sampling signal, wherein i and N are integers, $N \geq 2$, $1 \leq i \leq 2N-1$.

It should be noted that j is an integer, and $1 \leq j \leq N$.

Figure 5:
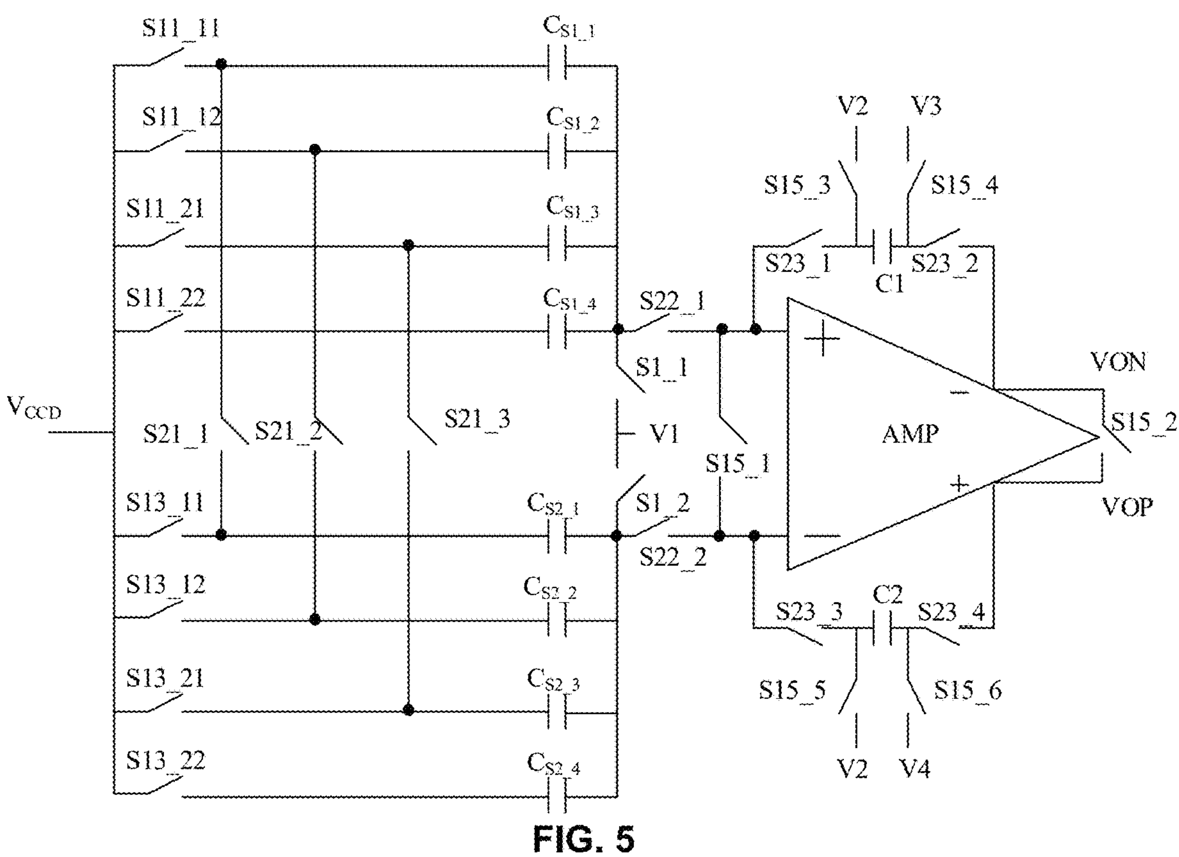
FIG. 5 is a specific structural diagram of a circuit for sampling an imaging signal shown in an exemplary embodiment of the present application.

Please refer to FIG. 5, which is a specific structural diagram of a circuit for sampling an imaging signal according to an exemplary embodiment of the present application.

In an exemplary embodiment, the first sampling module includes 2N reset sampling units and a first reference unit, the reset sampling unit is connected to the first sampling signal, and the imaging signal is sampled based on the first sampling signal to obtain the reset voltage. The first reference unit is connected to the reset sampling unit, the first reference voltage, and the second sampling signal, and the first reference voltage is used as a reference value of the reset sampling unit based on the second sampling signal. In an exemplary embodiment, as shown in FIG. 5, the first sampling module includes 4 reset sampling units and a first reference unit, the first reset sampling unit and the second reset sampling unit are connected to the first first sampling signal K11_1, and the second reset sampling unit and the third reset sampling unit are connected to the second first sampling signal K11_2. Under the control of the first first sampling signal K11_1 and the second first sampling signal K11_2, the imaging signal VCCD is sampled twice to obtain 4 reset voltages. The first reference unit is connected to the 4 reset sampling units, the first reference voltage V1, and the second sampling signal K2. During sampling, the first reference voltage V1 is used as a reference value of the reset sampling unit based on the control of the second sampling signal K2.

In an exemplary embodiment, the reset sampling unit includes a first sampling switch and a first sampling capacitor, one end of the first sampling switch is connected to the imaging signal, the other end of the first sampling switch is connected to one end of the first sampling capacitor, and the control end of the first sampling switch is connected to the first sampling signal; the first reference unit includes a second sampling switch, one end of the second sampling switch is connected to the other end of the first sampling capacitor, the other end of the second sampling switch is connected to the first reference voltage, and the control end of the second sampling switch is connected to the second sampling signal.

In an exemplary embodiment, as shown in FIG. 5, the first reset sampling unit includes a first sampling switch S11_11 and a first sampling capacitor CS1_1, one end of the first sampling switch S11_11 is connected to the imaging signal VCCD, the other end of the first sampling switch S11_11 is connected to one end of the first sampling capacitor CS1_1, and the control end of the first sampling switch S11_11 is connected to the first first sampling signal K11_1; the second reset sampling unit includes a first sampling switch S11_12 and a first sampling capacitor CS1_2, one end of the first sampling switch S11_12 is connected to the imaging signal VCCD, the other end of the first sampling switch S11_12 is connected to one end of the first sampling capacitor CS1_2, and the control end of the first sampling switch S11_12 is connected to the first first sampling signal K11_1.

In an exemplary embodiment, the third reset sampling unit includes a first sampling switch S11_21 and a first sampling capacitor CS1_3, one end of the first sampling switch S11_21 is connected to the imaging signal VCCD, the other end of the first sampling switch S11_21 is connected to one end of the first sampling capacitor CS1_3, and the control end of the first sampling switch S11_21 is connected to the second first sampling signal K11_2; the fourth reset sampling unit includes a first sampling switch S11_22 and a first sampling capacitor CS1_4, one end of the first sampling switch S11_22 is connected to the imaging signal VCCD, the other end of the first sampling switch S11_22 is connected to one end of the first sampling capacitor CS1_4, and the control end of the first sampling switch S11_22 is connected to the second first sampling signal K11_2. The first reference unit includes a second sampling switch S1_1, one end of the second sampling switch S1_1 is connected to the other ends of the first sampling capacitors (CS1_1, CS1_2, CS1_3, CS1_4), the other end of the second sampling switch S1_1 is connected to the first reference voltage V1, and the control end of the second sampling switch S1_1 is connected to the second sampling signal K2.

In an exemplary embodiment, the second sampling module includes 2N signal sampling units and a second reference unit. The signal sampling unit is connected to the third sampling signal, and the imaging signal is sampled based on the third sampling signal to obtain a signal voltage; the second reference unit is connected to the signal sampling unit, the first reference voltage, and the fourth sampling signal, and the first reference voltage is used as a reference value of the signal sampling unit based on the fourth sampling signal. As shown in FIG. 5, the second sampling module includes four signal sampling units and a second reference unit, the first signal sampling unit and the second signal sampling unit are connected to the first third sampling signal K13_1, and the third signal sampling unit and the fourth signal sampling unit are connected to the second third sampling signal K13_2. Under the control of the first third sampling signal K13_1 and the second third sampling signal K13_2, the imaging signal VCCD is sampled twice to obtain four signal voltages. The second reference unit is connected to the four signal sampling units, the first reference voltage V1, and the fourth sampling signal K4. During sampling, based on the control of the fourth sampling signal K4, the first reference voltage V1 is used as a reference value of the signal sampling unit.

In an exemplary embodiment, the signal sampling unit includes a third sampling switch and a second sampling capacitor, one end of the third sampling switch is connected to the imaging signal, the other end of the third sampling switch is connected to one end of the second sampling capacitor, and the control end of the third sampling switch is connected to the third sampling signal. The second reference unit includes a fourth sampling switch, one end of the fourth sampling switch is connected to the other end of the second sampling capacitor, the other end of the fourth sampling switch is connected to the first reference voltage, and the control end of the fourth sampling switch is connected to the fourth sampling signal.

In an exemplary embodiment, as shown in FIG. 5, the first signal sampling unit includes a third sampling switch S13_11 and a second sampling capacitor CS2_1, one end of the third sampling switch S13_11 is connected to the imaging signal VCCD, the other end of the third sampling switch S13_11 is connected to one end of the second sampling capacitor CS2_1, and the control end of the third sampling switch S13_11 is connected to the first third sampling signal K13_1; the second signal sampling unit includes a third sampling switch S13_12 and a second sampling capacitor CS2_2, one end of the third sampling switch S13_12 is connected to the imaging signal VCCD, the other end of the third sampling switch S13_12 is connected to one end of the second sampling capacitor CS2_2, and the control end of the third sampling switch S13_12 is connected to the first third sampling signal K13_1.

In an exemplary embodiment, the third signal sampling unit includes a third sampling switch S13_21 and a second sampling capacitor CS2_3, one end of the third sampling switch S13_21 is connected to the imaging signal VCCD, the other end of the third sampling switch S13_21 is connected to one end of the second sampling capacitor CS2_3, and the control end of the third sampling switch S13_21 is connected to the second third sampling signal K13_2; the fourth signal sampling unit includes a third sampling switch S13_22 and a second sampling capacitor CS2_4, one end of the third sampling switch S13_22 is connected to the imaging signal VCCD, the other end of the third sampling switch S13_22 is connected to one end of the second sampling capacitor CS2_4, and the control end of the third sampling switch S13_22 is connected to the second third sampling signal K13_2. The second reference unit includes a fourth sampling switch S1_2, one end of the fourth sampling switch S1_2 is connected to the other ends of the second sampling capacitors (CS2_1, CS2_2, CS2_3, CS2_4), the other end of the fourth sampling switch S1_2 is connected to the first reference voltage V1, and the control end of the fourth sampling switch S1_2 is connected to the fourth sampling signal K4.

It should be noted that the capacitance value of the first sampling capacitor is equal to the capacitance value of the second sampling capacitor.

In an exemplary embodiment, the amplification module includes a differential processing unit and an amplification unit; the differential processing unit is connected to 2N−1 differential connection signals and a first amplifying signal. Under the control of the 2N−1 differential connection signals and the first amplifying signal, 2N reset voltages and 2N signal voltages are connected one-to-one to obtain 2N−1 differential signals; the amplification unit is connected to the differential processing unit, the second amplifying signal, and the reset signal; when the reset signal controls the amplification unit to perform a reset operation, the first sampling module or the second sampling module is synchronously controlled to sample the imaging signal; after the sampling is completed, the 2N−1 differential signals are amplified sequentially under the control of the second amplifying signal to obtain 2N−1 sampling signals. It should be noted that, as shown in FIG. 5, the amplification module includes a differential processing unit and an amplification unit; the differential processing unit is connected to three differential connection signals K22_i and a first amplifying signal K22. Under the control of the three differential connection signals K22_i and the first amplifying signal K22, three reset voltages are connected to three signal voltages one-to-one to obtain three differential signals. The amplification unit is connected to a second amplifying signal K23 and a reset signal K15. When the reset signal K15 controls the amplification unit to perform a reset operation, at the same time, the first sampling module is controlled to sample the imaging signal VCCD or the second sampling module is controlled to sample the imaging signal VCCD. After the sampling is completed, the three differential signals are amplified sequentially under the control of the second amplifying signal K23 to obtain three sampling signals.

In an exemplary embodiment, the differential processing unit includes N−1 differential connection switches, a first amplifying switch, and a second amplifying switch; one end of the ith differential connection switch is connected to one end of the ith first sampling capacitor, the other end of the ith first sampling capacitor is connected to one end of the first amplifying switch, the other end of the ith differential connection switch is connected to one end of the ith second sampling capacitor, the other end of the ith second sampling capacitor is connected to one end of the second amplifying switch, the control end of the ith differential connection switch is connected to the ith differential connection signal, the control end of the first amplifying switch and the control end of the second amplifying switch are connected to the first amplifying signal, the other end of the first amplifying switch is a first output end of the differential processing unit, and the other end of the second amplifying switch is a second output end of the differential processing unit.

In an exemplary embodiment, as shown in FIG. 5, the differential processing unit includes a first differential connection switch S21_1, a second differential connection switch S21_2, a third differential connection switch S21_3, a first amplifying switch S22_1, and a second amplifying switch S22_2. One end of the first differential connection switch S21_1 is connected to one end of the first first sampling capacitor CS1_1, the other end of the first first sampling capacitor CS1_1 is connected to one end of the first amplifying switch S22_1, the other end of the first differential connection switch S21_1 is connected to one end of the first second sampling capacitor CS2_1, the other end of the first second sampling capacitor CS2_1 is connected to one end of the second amplifying switch S22_2, and the control end of the first differential connection switch S21_1 is connected to the first differential connection signal K21_1; one end of the second differential connection switch S21_2 is connected to one end of the second first sampling capacitor CS1_2, the other end of the second first sampling capacitor CS1_2 is connected to one end of the first amplifying switch S22_1, the other end of the second differential connection switch S21_2 is connected to one end of the second second sampling capacitor CS2_2, the other end of the second second sampling capacitor CS2_2 is connected to one end of the second amplifying switch S22_2, and the control end of the second differential connection switch S21_2 is connected to the second differential connection signal K21_2; one end of the third differential connection switch S21_3 is connected to one end of the third first sampling capacitor CS1_3, the other end of the third first sampling capacitor CS1_3 is connected to one end of the first amplifying switch S22_1, the other end of the third differential connection switch S21_3 is connected to one end of the third second sampling capacitor CS2_3, and the other end of the third second sampling capacitor CS2_3 is connected to one end of the second amplifying switch S22_2, the control end of the third differential connection switch S21_3 is connected to the third differential connection signal K21_3, the control end of the first amplifying switch S22_1 and the control end of the second amplifying switch S22_2 are connected to the first amplifying signal K22, the other end of the first amplifying switch S22_1 is the first output end of the differential processing unit, and the other end of the second amplifying switch S22_2 is the second output end of the differential processing unit.

In an exemplary embodiment, as shown in FIG. 5, the amplification unit includes a first reset switch S15_1, a second reset switch S15_2, a third reset switch S15_3, a fourth reset switch S15_4, a fifth reset switch S15_5, a sixth reset switch S15_6, a third amplifying switch S23_1, a fourth amplifying switch S23_2, a fifth amplifying switch S23_3, a sixth amplifying switch S23_4, a first feedback capacitor C1, a second feedback capacitor C2, and an operational amplifier AMP. One end of the first reset switch S15_1 is connected to the non-inverting input end of the operational amplifier AMP, and the other end of the first reset switch S15_1 is connected to the inverting input end of the operational amplifier AMP. The non-inverting input end of the operational amplifier AMP is connected, in sequence, through the third amplifier switch S23_1, the first feedback capacitor C1, and the fourth amplifier switch S23_2 connected in series, to the inverting output end of the operational amplifier AMP. The inverting output end of the operational amplifier AMP is connected in sequence, through the fifth amplifier switch S23_3, the second feedback capacitor C2, and the sixth amplifier switch S23_4 connected in series, to the non-inverting output end of the operational amplifier AMP. The inverting output end of the operational amplifier AMP is connected to the non-inverting output end of the operational amplifier AMP through the second reset switch S15_2 connected in series. The second reference voltage V2 is connected to one end of the first feedback capacitor C1 through the third reset switch S15_3 connected in series. The third reference voltage V3 is connected to the other end of the first feedback capacitor C1 via the fourth reset switch S15_4 connected in series. The second reference voltage V2 is connected to one end of the second feedback capacitor C2 via the fifth reset switch S15_5 connected in series. The fourth reference voltage V4 is connected to the other end of the second feedback capacitor C2 via the sixth reset switch S15_6 connected in series. The control end of the first reset switch S15_1, the control end of the second reset switch S15_2, the control end of the third reset switch S15_3, the control end of the fourth reset switch S15_4, the control end of the fifth reset switch S15_5, and the control end of the sixth reset switch S15_6 are connected to the reset signal K15. The control end of the third amplifying switch S23_1, the control end of the fourth amplifying switch S23_2, the control end of the fifth amplifying switch S23_3, and the control end of the sixth amplifying switch S23_4 are connected to the second amplifying signal K23. The non-inverting input end of the operational amplifier AMP is connected to the first output end of the differential processing unit, the non-inverting input end of the operational amplifier AMP is connected to the other end of the first amplifying switch S22_1, the inverting input end of the operational amplifier AMP is connected to the second output end of the differential processing unit, the inverting input end of the operational amplifier AMP is connected to the other end of the second amplifying switch S22_2, and the non-inverting output end of the operational amplifier AMP and the inverting output end of the operational amplifier AMP cooperate to output the sampling signal.

As shown in FIG. 4 to FIG. 7, the principle of the circuit for sampling an imaging signal in an embodiment provided by the present application is specifically as follows.

When N is 2, the first sampling module includes four reset sampling units, the control ends of the first sampling switches in the first reset sampling unit and the second reset sampling unit are connected to the first first sampling signal K11_1, and the control ends of the first sampling switches in the third reset sampling unit and the fourth reset sampling unit are connected to the second first sampling signal K11_2; the second sampling module includes four signal sampling units, the control ends of the third sampling switches in the first reset sampling unit and the second reset sampling unit are connected to the first third sampling signal K13_1, and the control ends of the third sampling switches in the third reset sampling unit and the fourth reset sampling unit are connected to the second third sampling signal K13_2.

Figure 6:
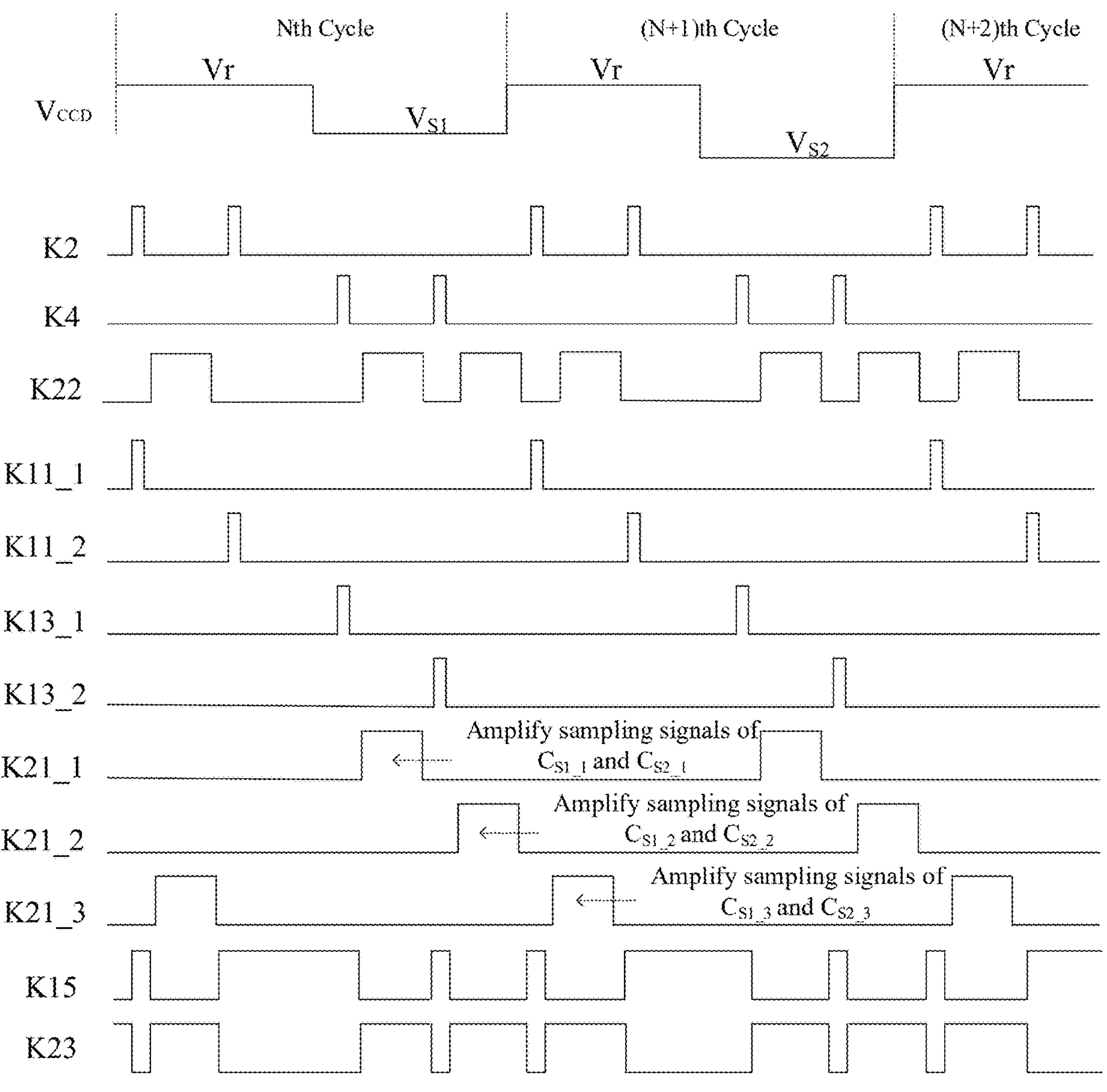
FIG. 6 is a timing diagram of a circuit for sampling an imaging signal according to an exemplary embodiment of the present application.
Figure 7:
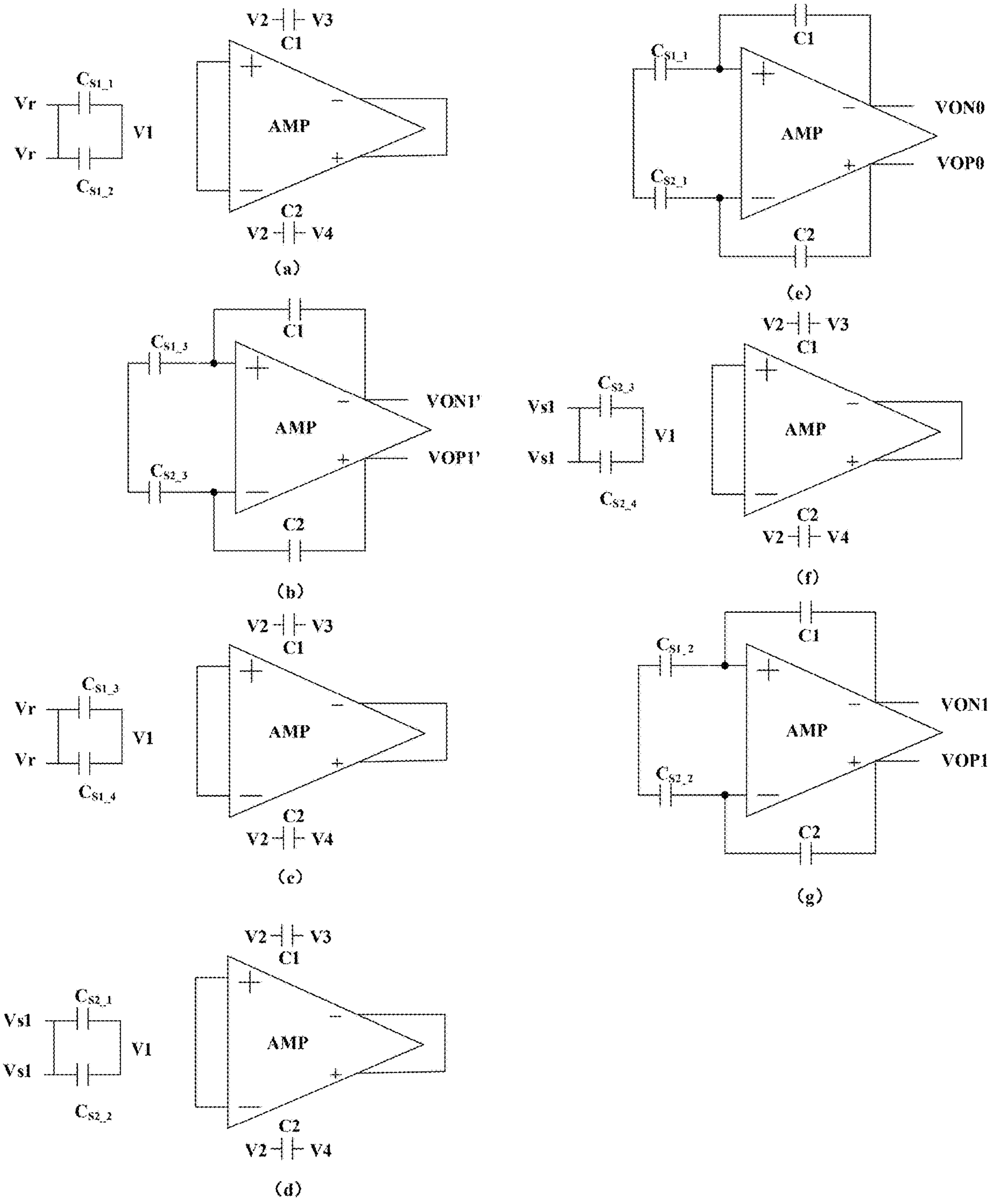
FIG. 7 is an exploded diagram of sampling and differential amplification of a circuit for sampling an imaging signal according to an exemplary embodiment of the present application.

As shown in FIG. 6, when the imaging signal VCCD is in the Nth cycle and the imaging signal VCCD is in the first state, that is, when the value of the imaging signal VCCD is the reset level Vr, the first first sampling signal K11_1 and the second sampling signal K2 are set to a high level, the reset signal K15 is set to a high level, the first first sampling switch S11_11 and the second first sampling switch S11_12 are turned on, the second sampling switch S1_1 is turned on, the imaging signal VCCD is sampled twice based on the first first sampling capacitor CS1_1 and the second first sampling capacitor CS1_2, and the operational amplifier AMP is reset according to the reset signal K15. The equivalent circuit diagram of the sampling of the imaging signal is shown in FIG. 7(*a*).

After sampling is completed, the third differential connection signal K21_3 is set to a high level, the first amplifying signal K22 and the second amplifying signal K23 are set to a high level, the third differential connection switch S21_3 is turned on, the first amplified switch S22_1, the second amplified switch S22_2, the third amplified switch S23_1, the fourth amplified switch S23_2, the fifth amplified switch S23_3, and the sixth amplified switch S23_4 are turned on, the reset voltage of the third first sampling capacitor CS1_3 and the signal voltage of the third second sampling capacitor CS2_3 in the (N−1)th cycle are differentially amplified to obtain a sampling signal, which is VOP1'-VON1'. The equivalent circuit diagram of imaging signal sampling is shown in FIG. 7(*b*).

After amplification is completed, the second first sampling signal K11_2 and the second sampling signal K2 are set to a high level, the reset signal K15 is set to a high level, the third first sampling switch S11_21 and the fourth first sampling switch S11_22 are turned on, the second sampling switch S1_1 is turned on, the imaging signal VCCD is sampled twice based on the third first sampling capacitor CS1_3 and the fourth first sampling capacitor CS1_4, and the operational amplifier AMP is reset according to the reset signal K15. The equivalent circuit diagram of the sampling of the imaging signal is shown in FIG. 7(*c*).

After sampling is completed, the imaging signal VCCD is in the Nth cycle, and the imaging signal VCCD changes to the second state, that is, when the value of the imaging signal VCCD is the signal level VS1, the first third sampling signal K13_1 and the fourth sampling signal K4 are set to a high level, the reset signal K15 is set to a high level, the first third sampling switch S13_11 and the second third sampling switch S13_12 are turned on, the fourth sampling switch S1_2 is turned on, the imaging signal VCCD is sampled twice based on the first second sampling capacitor CS2_1 and the second second sampling capacitor CS2_2, and the operational amplifier AMP is reset according to the reset signal K15. The equivalent circuit diagram of the sampling of the imaging signal is shown in FIG. 7(*d*).

After sampling is completed, the first differential connection signal K21_1 is set to a high level, the first amplifying signal K22 and the second amplifying signal K23 are set to a high level, the first differential connection switch S21_1 is turned on, the first amplified switch S22_1, the second amplified switch S22_2, the third amplified switch S23_1, the fourth amplified switch S23_2, the fifth amplified switch S23_3, and the sixth amplified switch S23_4 are turned on, and the reset voltage of the first first sampling capacitor CS1_1 and the signal voltage of the first second sampling capacitor CS2_1 in the Nth cycle are differentially amplified to obtain a sampling signal, which is VOP0-VON0. The equivalent circuit diagram of imaging signal sampling is shown in FIG. 7(*e*).

After amplification is completed, the second third sampling signal K13_2 and the fourth sampling signal K4 are set to a high level, the reset signal K15 is set to a high level, the third third sampling switch S13_21 and the fourth third sampling switch S13_22 are turned on, the fourth sampling switch S1_2 is turned on, the imaging signal VCCD is sampled twice based on the third second sampling capacitor CS2_3 and the fourth second sampling capacitor CS2_4, and the operational amplifier AMP is reset according to the reset signal K15. The equivalent circuit diagram of the sampling of the imaging signal is shown in FIG. 7(*f*).

After sampling is completed, the second differential connection signal K21_2 is set to a high level, the first amplifying signal K22 and the second amplifying signal K23 are set to a high level, the second differential connection switch S21_2 is turned on, the first amplified switch S22_1, the second amplified switch S22_2, the third amplified switch S23_1, the fourth amplified switch S23_2, the fifth amplified switch S23_3, and the sixth amplified switch S23_4 are turned on, and the second first sampling capacitor CS1_2 and the second second sampling capacitor CS2_2 in the Nth cycle are differentially amplified to obtain a sampling signal, which is VOP1-VON1. The equivalent circuit diagram of imaging signal sampling is shown in FIG. 7(*g*).

It should be noted that the sampling signal in the Nth cycle is determined as shown in expression (1) or (2):

$$VOP-VON=C1/CS1\_m((Vr-VS1)-(V3-V4)) \quad (1)$$

$$VOP-VON=C2/CS2\_m((Vr-VS1)-(V3-V4)). \quad (2)$$

In expressions (1) and (2), VOP-VON is the sampling signal, C1 is the first feedback capacitor, C2 is the second feedback capacitor, CS1_m is the first sampling capacitor, CS2_m is the second sampling capacitor, and Vr is the reset voltage of the imaging signal in the first state, VS1 is the signal voltage of the imaging signal in the second state, V3 is the third reference voltage, V4 is the fourth reference voltage, wherein m is an integer, 1≤m≤2N.

Similarly, the principle of determining the sampling signal in other cycles is the same, except that when the imaging signal is in the second state, the value of the signal voltage is different, which will not be described here.

Figure 8:
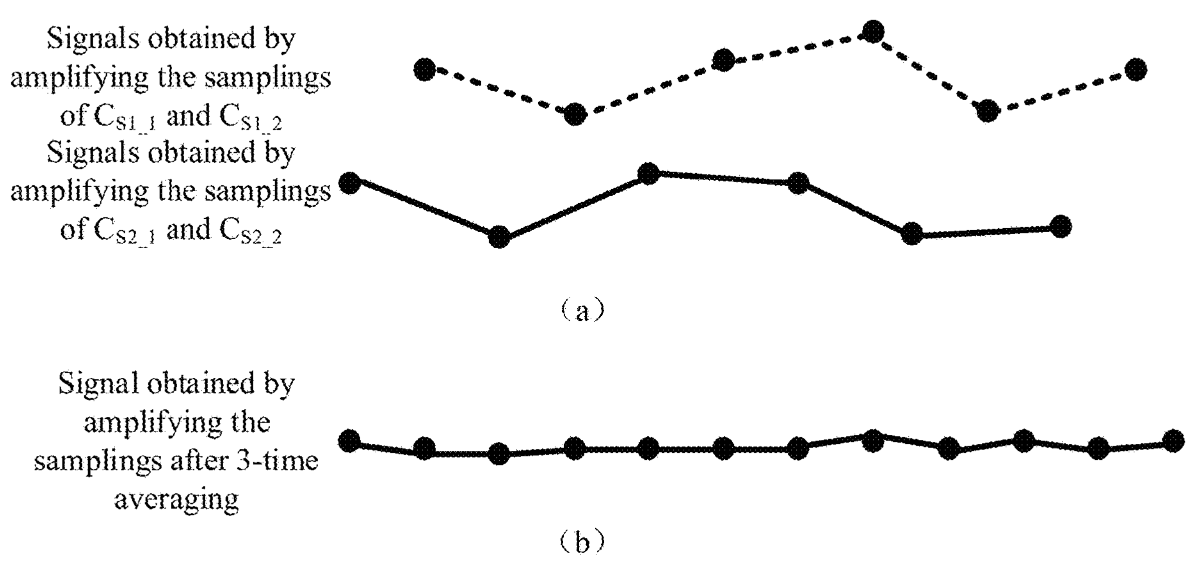
FIG. 8 is a comparison diagram of a previously mentioned sampling signal and a sampling signal of the present application shown in an exemplary embodiment of the present application.

Please refer to FIG. 8, which is a comparison diagram of a previously mentioned sampling signal and a sampling signal of the present application shown in an exemplary embodiment of the present application.

Under the same conditions, the previously mentioned circuit for sampling an imaging signal and the circuit for sampling an imaging signal provided by the present application are simulated, as shown in FIG. 8. The sampling signal of the previously mentioned circuit for sampling an imaging signal is shown in FIG. 8(*a*), from which it can be seen that after the two sampling networks are alternately sampled, there is an obvious offset between the output signals of the operational amplifier AMP. At the same time, after the same sampling network is sampled, there is a large noise in the output signal of the operational amplifier AMP. The sampling signal output of the circuit for sampling an imaging signal provided by the present application is shown in FIG. 8(*b*), and it can be seen from FIG. 8(*b*) that the noise of the output signal is significantly suppressed, and the offset caused by the previously mentioned circuit for sampling an imaging signal is eliminated.

Figure 9:
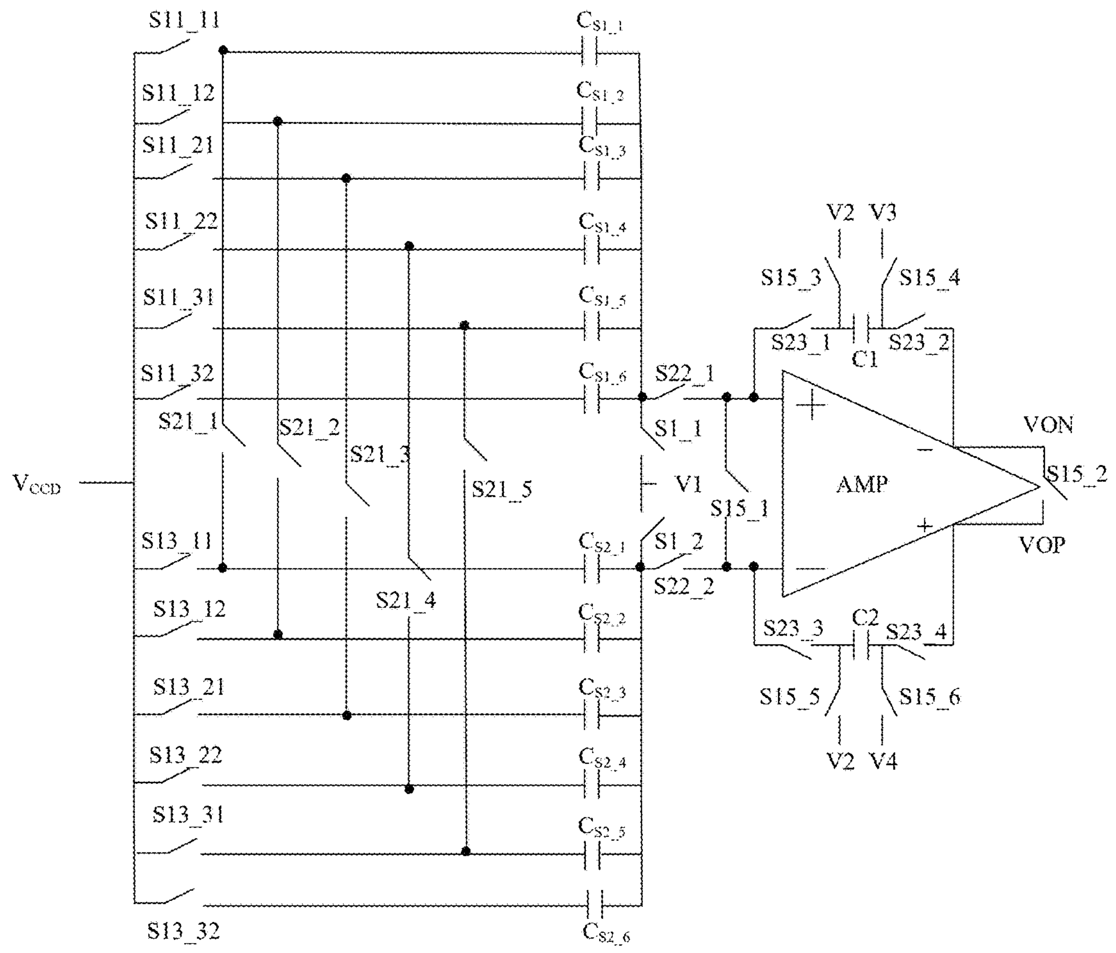
FIG. 9 is a specific structural diagram of a circuit for sampling an imaging signal shown in an exemplary embodiment of the present application.

Please refer to FIG. 9, which is a specific structural diagram of a circuit for sampling an imaging signal according to another exemplary embodiment of the present application.

Figure 10:
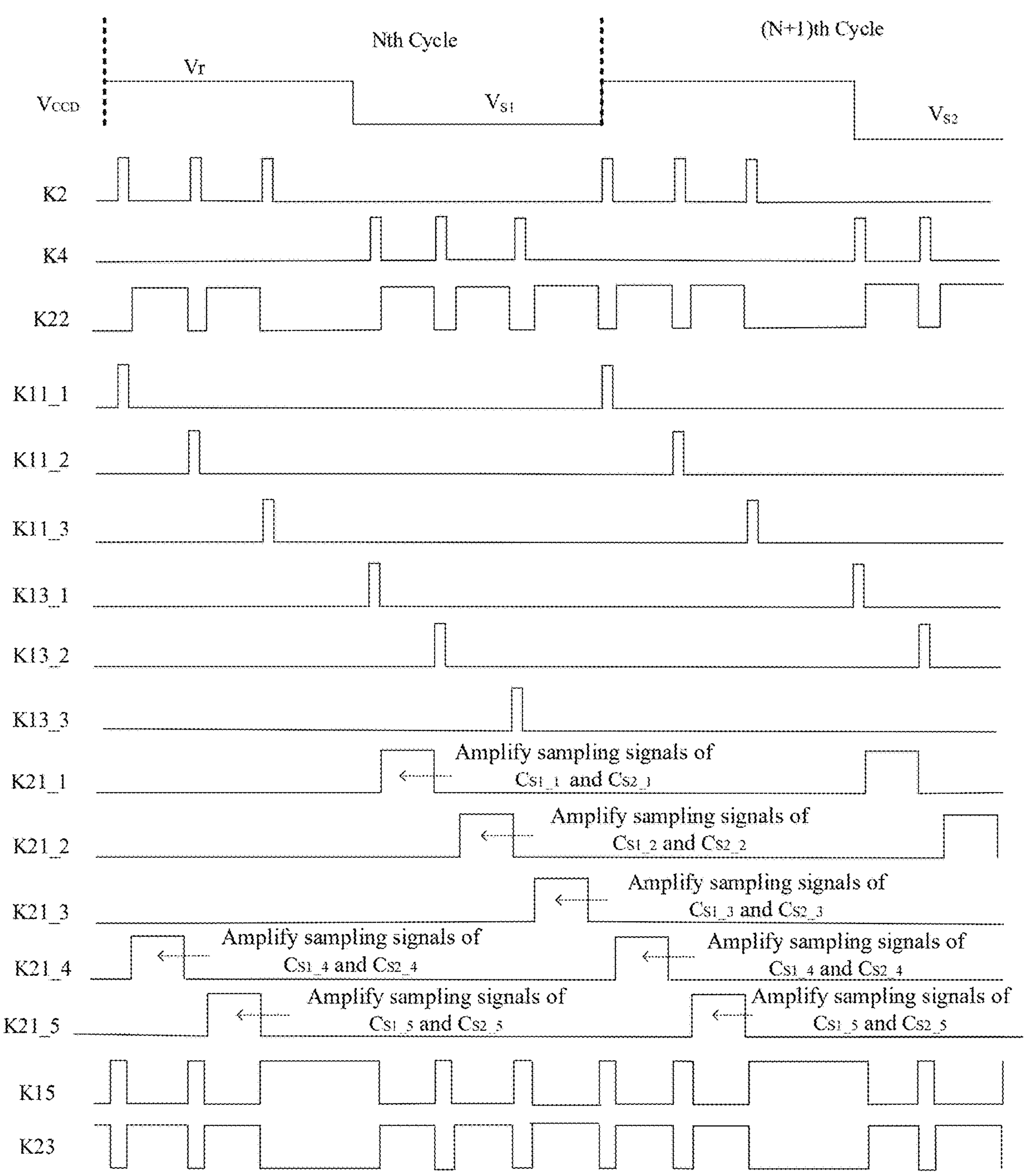
FIG. 10 is a timing control diagram of a circuit for sampling an imaging signal according to an exemplary embodiment of the present application.

Please refer to FIG. 10, which is a timing control diagram of a circuit for sampling an imaging signal according to another exemplary embodiment of the present application.

In an exemplary embodiment, as shown in FIG. 9, when N is 3, the first sampling module includes six reset sampling units and a first reference unit, the first reset sampling unit and the second reset sampling unit are connected to the first first sampling signal K11_1, the third reset sampling unit and the fourth reset sampling unit are connected to the second first sampling signal K11_2, the fifth reset sampling unit and the sixth reset sampling unit are connected to the third first sampling signal K11_3, and under the control of the first first sampling signal K11_1, the second first sampling signal K11_2, and the third first sampling signal K11_3, the imaging signal VCCD is sampled three times to obtain six reset voltages; the first reference unit is connected to the six reset sampling units, the first reference voltage V1 and the second sampling signal K2. During sampling, based on the control of the second sampling signal K2, the first reference voltage V1 is used as a reference value of the six reset sampling units.

In an exemplary embodiment, as shown in FIG. 9, the first reset sampling unit includes a first sampling switch S11_11 and a first sampling capacitor CS1_1, one end of the first sampling switch S11_11 is connected to the imaging signal VCCD, the other end of the first sampling switch S11_11 is connected to one end of the first sampling capacitor CS1_1, and the control end of the first sampling switch S11_11 is connected to the first first sampling signal K11_1; the second reset sampling unit includes a first sampling switch S11_12 and a first sampling capacitor CS1_2, one end of the first sampling switch S11_12 is connected to the imaging signal VCCD, the other end of the first sampling switch S11_12 is connected to one end of the first sampling capacitor CS1_2, and the control end of the first sampling switch S11_12 is connected to the first first sampling signal K11_1.

As shown in FIG. 9, the third reset sampling unit includes a first sampling switch S11_21 and a first sampling capacitor CS1_3, one end of the first sampling switch S11_21 is connected to the imaging signal VCCD, the other end of the first sampling switch S11_21 is connected to one end of the first sampling capacitor CS1_3, and the control end of the first sampling switch S11_21 is connected to the second first sampling signal K11_2; the fourth reset sampling unit includes a first sampling switch S11_22 and a first sampling capacitor CS1_4, one end of the first sampling switch S11_22 is connected to the imaging signal VCCD, the other end of the first sampling switch S11_22 is connected to one end of the first sampling capacitor CS1_4, and the control end of the first sampling switch S11_22 is connected to the second first sampling signal K11_2.

As shown in FIG. 9, the fifth reset sampling unit includes a first sampling switch S11_31 and a first sampling capacitor CS1_5, one end of the first sampling switch S11_31 is connected to the imaging signal VCCD, the other end of the first sampling switch S11_31 is connected to one end of the first sampling capacitor CS1_5, and the control end of the first sampling switch S11_31 is connected to the third first sampling signal K11_3; the sixth reset sampling unit includes a first sampling switch S11_32 and a first sampling capacitor CS1_6, one end of the first sampling switch S11_32 is connected to the imaging signal VCCD, the other end of the first sampling switch S11_32 is connected to one end of the first sampling capacitor CS1_6, and the control end of the first sampling switch S11_32 is connected to the third first sampling signal K11_3. The first reference unit includes a second sampling switch S1_1, one end of the second sampling switch S1_1 is connected to the other ends of the first sampling capacitors (CS1_1, CS1_2, CS1_3, CS1_4, CS1_5, CS1_6), the other end of the second sampling switch S1_1 is connected to the first reference voltage V1, and the control end of the second sampling switch S1_1 is connected to the second sampling signal K2.

In an exemplary embodiment, as shown in FIG. 9, the second sampling module includes six signal sampling units and a second reference unit. The first signal sampling unit and the second signal sampling unit are connected to the first third sampling signal K13_1, the third signal sampling unit and the fourth signal sampling unit are connected to the second third sampling signal K13_2, and the fifth signal sampling unit and the sixth signal sampling unit are connected to the third third sampling signal K13_3. Under the control of the first third sampling signal K13_1, the second third sampling signal K13_2, and the third third sampling signal K13_3, the imaging signal VCCD is sampled three times to obtain six signal voltages; the second reference unit is connected to the six signal sampling units, the first reference voltage V1, and the fourth sampling signal K4. During sampling, based on the control of the fourth sampling signal K4, the first reference voltage V1 is used as the reference value of the signal sampling unit.

In an exemplary embodiment, as shown in FIG. 9, the first signal sampling unit includes a third sampling switch S13_11 and a second sampling capacitor CS2_1, one end of the third sampling switch S13_11 is connected to the imaging signal VCCD, the other end of the third sampling switch S13_11 is connected to one end of the second sampling capacitor CS2_1, and the control end of the third sampling switch S13_11 is connected to the first third sampling signal K13_1; the second signal sampling unit includes a third sampling switch S13_12 and a second sampling capacitor CS2_2, one end of the third sampling switch S13_12 is connected to the imaging signal VCCD, the other end of the third sampling switch S13_12 is connected to one end of the second sampling capacitor CS2_2, and the control end of the third sampling switch S13_12 is connected to the first third sampling signal K13_1.

As shown in FIG. 9, the third signal sampling unit includes a third sampling switch S13_21 and a second sampling capacitor CS2_3, one end of the third sampling switch S13_21 is connected to the imaging signal VCCD, the other end of the third sampling switch S13_21 is connected to one end of the second sampling capacitor CS2_3, and the control end of the third sampling switch S13_21 is connected to the second third sampling signal K13_2; the fourth signal sampling unit includes a third sampling switch S13_22 and a second sampling capacitor CS2_4, one end of the third sampling switch S13_22 is connected to the imaging signal VCCD, the other end of the third sampling switch S13_22 is connected to one end of the second sampling capacitor CS2_4, and the control end of the third sampling switch S13_22 is connected to the second third sampling signal K13_2.

As shown in FIG. 9, the fifth signal sampling unit includes a third sampling switch S13_31 and a second sampling capacitor CS2_5, one end of the third sampling switch S13_31 is connected to the imaging signal VCCD, the other end of the third sampling switch S13_31 is connected to one end of the second sampling capacitor CS2_5, and the control end of the third sampling switch S13_31 is connected to the third third sampling signal K13_3; the sixth signal sampling unit includes a third sampling switch S13_32 and a second sampling capacitor CS2_6, one end of the third sampling switch S13_32 is connected to the imaging signal VCCD, the other end of the third sampling switch S13_32 is connected to one end of the second sampling capacitor CS2_6, and the control end of the third sampling switch S13_32 is connected to the third third sampling signal K13_3. The second reference unit includes a fourth sampling switch S1_2, one end of the fourth sampling switch S1_2 is connected to the other ends of the second sampling capacitors (CS2_1, CS2_2, CS2_3, CS2_4, CS2_5, CS2_6), the other end of the fourth sampling switch S1_2 is connected to the first reference voltage V1, and the control end of the fourth sampling switch S1_2 is connected to the fourth sampling signal K4.

In an exemplary embodiment, as shown in FIG. 9, the differential processing unit includes a first differential connection switch S21_1, a second differential connection switch S21_2, a third differential connection switch S21_3, a fourth differential connection switch S21_4, a fifth differential connection switch S21_5, a first amplifying switch S22_1, and a second amplifying switch S22_2. One end of the first differential connection switch S21_1 is connected to one end of the first first sampling capacitor CS1_1, the other end of the first first sampling capacitor CS1_1 is connected to one end of the first amplifying switch S22_1, the other end of the first differential connection switch S21_1 is connected to one end of the first second sampling capacitor CS2_1, the other end of the first second sampling capacitor CS2_1 is connected to one end of the second amplifying switch S22_2, and the control end of the first differential connection switch S21_1 is connected to the first differential connection signal K21_1; one end of the second differential connection switch S21_2 is connected to one end of the second first sampling capacitor CS1_2, the other end of the second first sampling capacitor CS1_2 is connected to one end of the first amplifying switch S22_1, the other end of the second differential connection switch S21_2 is connected to one end of the second second sampling capacitor CS2_2, the other end of the second second sampling capacitor CS2_2 is connected to one end of the second amplifying switch S22_2, and the control end of the second differential connection switch S21_2 is connected to the second differential connection signal K21_2.

In an exemplary embodiment, one end of the third differential connection switch S21_3 is connected to one end of the third first sampling capacitor CS1_3, the other end of the third first sampling capacitor CS1_3 is connected to one end of the first amplifying switch S22_1, the other end of the third differential connection switch S21_3 is connected to one end of the third second sampling capacitor CS2_3, the other end of the third second sampling capacitor CS2_3 is connected to one end of the second amplifying switch S22_2, and the control end of the third differential connection switch S21_3 is connected to the third differential connection signal K21_3; one end of the fourth differential connection switch S21_4 is connected to one end of the fourth first sampling capacitor CS1_4, the other end of the fourth first sampling capacitor CS1_4 is connected to one end of the first amplifying switch S22_1, the other end of the fourth differential connection switch S21_4 is connected to one end of the fourth second sampling capacitor CS2_4, the other end of the fourth second sampling capacitor CS2_4 is connected to one end of the second amplifying switch S22_2, and the control end of the fourth differential connection switch S21_4 is connected to the fourth differential connection signal K21_4; one end of the fifth differential connection switch S21_5 is connected to one end of the fifth first sampling capacitor CS1_5, the other end of the fifth first sampling capacitor CS1_5 is connected to one end of the first amplifying switch S22_1, the other end of the fifth differential connection switch S21_5 is connected to one end of the fifth second sampling capacitor CS2_5, the other end of the fifth second sampling capacitor CS2_5 is connected to one end of the second amplifying switch S22_2, the control end of the fifth differential connection switch S21_5 is connected to the fifth differential connection signal K21_5, the control end of the first amplifying switch S22_1 and the control end of the second amplifying switch S22_2 are connected to the first amplifying signal K22, the other end of the first amplifying switch S22_1 is the first output end of the differential processing unit, and the other end of the second amplifying switch S22_2 is the second output end of the differential processing unit.

As shown in FIGS. 9 to 10, the principle of the circuit for sampling an imaging signal in another embodiment provided by the present application is specifically as follows.

In the first half-cycle of the Nth cycle of the imaging signal, as shown in FIGS. 9 and 10, the first sampling module samples the reset level samples the reset level Vr of the imaging signal VCCD under the control of the three first sampling signals and the second sampling signal K2.

The first first sampling signal K11_1 and the second sampling signal K2 are at a high level. Taking the first voltage V1 as a reference, the imaging signal VCCD is sampled twice by the first reset sampling unit and the second reset sampling unit to obtain two reset voltages. At the same time, under the control of the reset signal K15, the amplification unit is in a reset state. After the sampling is completed, the first amplifying signal K22, the second amplifying signal K23, and the fourth differential connection signal K21_4 are at a high level. The amplification unit amplifies the reset voltage (the stored voltage of the fourth first sampling capacitor CS1_4) and the signal voltage (the stored voltage of the fourth second sampling capacitor CS2_4) sampled in the (N−1)th cycle to obtain a sampling signal.

The second first sampling signal K11_2 and the second sampling signal K2 are at a high level. Taking the first voltage V1 as a reference, the imaging signal VCCD is sampled twice through the third reset sampling unit and the fourth reset sampling unit to obtain two reset voltages. At the same time, under the control of the reset signal K15, the amplification unit is in a reset state. After the sampling is completed, the first amplifying signal K22, the second amplifying signal K23, and the fifth differential connection signal K21_5 are at a high level. The amplification unit amplifies the reset voltage (the stored voltage of the fifth first sampling capacitor CS1_5) and the signal voltage (the stored voltage of the fifth second sampling capacitor CS2_5) sampled in the (N−1)th cycle to obtain a sampling signal.

The third first sampling signal K11_3 and the second sampling signal K2 are at a high level. Taking the first voltage V1 as a reference, the imaging signal VCCD is sampled twice through the fifth reset sampling unit and the sixth reset sampling unit to obtain two reset voltages. At the same time, under the control of the reset signal K15, the amplification unit is in a reset state. After the sampling is completed, as shown in FIG. 9, the imaging signal VCCD enters the second half-cycle.

In the second half-cycle of the Nth cycle of the imaging signal, the second sampling module samples the signal level VS1 of the imaging signal VCCD under the control of the three third sampling signals and the fourth sampling signal.

The first second sampling signal K13_1 and the fourth sampling signal K4 are at a high level. Taking the first voltage V1 as a reference, the imaging signal VCCD is sampled twice by the first signal sampling unit and the second signal sampling unit to obtain two signal voltages. At the same time, under the control of the reset signal K15, the amplification unit is in a reset state. After the sampling is completed, the first amplifying signal K22, the second amplifying signal K23, and the first differential connection signal K21_1 are at a high level. The amplification unit amplifies the reset voltage (the stored voltage of the first first sampling capacitor CS1_1) and the signal voltage (the stored voltage of the first second sampling capacitor CS2_1) sampled in the Nth cycle to obtain a sampling signal.

The second second sampling signal K13_2 and the fourth sampling signal K4 are at a high level. Taking the first voltage V1 as a reference, the imaging signal VCCD is sampled twice by the third signal sampling unit and the fourth signal sampling unit to obtain two signal voltages. At the same time, under the control of the reset signal K15, the amplification unit is in a reset state. After the sampling is completed, the first amplifying signal K22, the second amplifying signal K23, and the second differential connection signal K21_2 are at a high level. The amplification unit amplifies the reset voltage (the stored voltage of the second first sampling capacitor CS1_2) and the signal voltage (the stored voltage of the second second sampling capacitor CS2_2) sampled in the Nth cycle to obtain a sampling signal.

The third second sampling signal K13_3 and the fourth sampling signal K4 are at a high level. Taking the first voltage V1 as a reference, the imaging signal VCCD is sampled twice through the fifth signal sampling unit and the sixth signal sampling unit to obtain two signal voltages. At the same time, under the control of the reset signal K15, the amplification unit is in a reset state. After the sampling is completed, the first amplifying signal K22, the second amplifying signal K23, and the third differential connection signal K21_3 are at a high level. The amplification unit amplifies the reset voltage (the stored voltage of the third first sampling capacitor CS1_3) and the signal voltage (the stored voltage of the third second sampling capacitor CS2_3) sampled in the Nth cycle to obtain a sampling signal.

In summary, the circuit for sampling an imaging signal in the previous embodiment samples the voltage of the first half-cycle and the voltage of the second half-cycle of the imaging signal six times, and performs differential amplification processing on the sampled voltage five times to obtain five sampling signals, thereby suppressing the noise of the output sampling signal to a certain extent and eliminating the imbalance caused by the previously mentioned circuit for sampling an imaging signal.

It should be noted that, in the circuit for sampling an imaging signal provided in the present application, when the difference between the reset voltage and the signal voltage sampled by the 2Nth first sampling capacitor and the 2Nth second sampling capacitor has not been amplified, the first first sampling capacitor CS1_2 and the first second sampling capacitor CS2_2 are going to perform the next sampling. Therefore, only the imaging signals from the first 2N−1 samplings are amplified, and the 2Nth first sampling capacitor and the 2Nth second sampling capacitor are placed in the circuit as matching capacitors.

In addition, based on the same inventive design concept as the above circuit for sampling an imaging signal, the present application also provides an imaging signal sampling method, which includes: in a first half-cycle of the imaging signal, sampling the imaging signal N times, wherein each sampling is performed through M sampling capacitors to obtain M*N reset voltages; in the second half-cycle of the imaging signal, sampling the imaging signal N times, wherein each sampling is performed through M sampling capacitors to obtain M*N signal voltages; in each cycle, performing alternately a reset operation and a differential amplification processing, wherein 2N samplings are performed in sequence and synchronously with at least part of the reset operation; the M*N reset voltages and the M*N signal voltages are differentially amplified M*N−1 times to obtain M*N−1 sampling signals; in the tth differential amplification, the tth reset voltage and the tth signal voltage are differentially amplified to obtain the tth sampling signal, wherein t, N, and M are integers, N≥2, M≥2, and 1≤t≤M*N−1.

The present application provides a circuit and a method for sampling an imaging signal, the circuit includes: a first sampling module to sample the imaging signal N times to obtain 2N reset voltages under the control of N first sampling signals and a second sampling signal; and a second sampling module to sample the imaging signal N times to obtain 2N signal voltages under the control of N third sampling signals and a fourth sampling signal; in each cycle of the imaging signal, when the imaging signal is sampled, the amplification module is controlled by the reset signal to perform a reset operation, and after the sampling is completed, the 2N reset voltages and the 2N signal voltages are differentially amplified 2N−1 times in sequence to obtain 2N−1 sampling signals. In the present application, the imaging signal is sampled multiple times through two sampling modules to enhance the strength of the sampling circuit in suppressing the noise in the imaging signal, the reset voltages and the signal voltages obtained by the multiple samplings are amplified in sequence to obtains multiple sampling signals, and the offset error of the output signal is reduced by multiple averaging. The sampling circuit not only enhances the noise suppression ability but also reduces the error of the output signal, thereby improving the precision and accuracy of signal sampling.

The above embodiments are merely illustrative of the principles and effects of the present application, and are not intended to limit the present application. Anyone familiar with the technology may modify or change the above embodiments without violating the spirit and scope of the present application. Therefore, all equivalent modifications or changes made by a person of ordinary skill in the art without departing from the spirit and technical ideas disclosed by the present application shall still be covered by the claims of the present application.

What is claimed is:

1. A circuit for sampling an imaging signal, comprising:

a first sampling module connected to the imaging signal, a first reference voltage, N first sampling signals, and a second sampling signal, and the first sampling module configured to sample the imaging signal N times based on the first reference voltage under a control of the N first sampling signals and the second sampling signal to obtain 2N reset voltages;

a second sampling module connected to the imaging signal, the first reference voltage, N third sampling signals, and a fourth sampling signal, and the second sampling module configured to sample the imaging signal N times based on the first reference voltage under a control of the N third sampling signals and the fourth sampling signal to obtain 2N signal voltages; and an amplification module connected to the first sampling module, the second sampling module, 2N−1 differential connection signals, a first amplifying signal, a second amplifying signal, and a reset signal, wherein in each cycle of the imaging signal, the amplification module alternately performs a reset operation and a differential amplification process;

when the reset signal controls the amplification module to perform the reset operation, the first sampling module or the second sampling module is synchronously controlled to sample the imaging signal;

after sampling is completed, under a control of the 2N−1 differential connection signals, the first amplifying signal, and the second amplifying signal, the obtained 2N reset voltages and the obtained 2N signal voltages are differentially amplified 2N−1 times in sequence to obtain 2N−1 sampling signals;

during an ith amplification, an ith reset voltage and an ith signal voltage are differentially amplified to obtain an ith sampling signal; and i and N are integers, N≥2, and 1≤i≤2N−1.

2. The circuit for sampling an imaging signal according to claim 1, wherein the first sampling module includes 2N reset sampling units and a first reference unit;

each of the 2N reset sampling units is connected to the first sampling signal and configured to sample the imaging signal based on the first sampling signal to obtain the reset voltage; and the first reference unit is connected to the 2N reset sampling units, the first reference voltage, and the second sampling signal, and configured to use the first reference voltage as a reference value of the reset sampling unit based on the second sampling signal.

3. The circuit for sampling an imaging signal according to claim 2, wherein the reset sampling unit includes a first sampling switch and a first sampling capacitor, a first end of the first sampling switch is connected to the imaging signal, a second end of the first sampling switch is connected to a first end of the first sampling capacitor, and a control end of the first sampling switch is connected to the first sampling signal; and the first reference unit includes a second sampling switch, a first end of the second sampling switch is connected to a second end of the first sampling capacitor, a second end of the second sampling switch is connected to the first reference voltage, and a control end of the second sampling switch is connected to the second sampling signal.

4. The circuit for sampling an imaging signal according to claim 3, wherein the second sampling module includes 2N signal sampling units and a second reference unit;

the signal sampling unit is connected to a third sampling signal and configured to sample the imaging signal based on the third sampling signal to obtain the signal voltage; and the second reference unit is connected to the signal sampling unit, the first reference voltage, and the fourth sampling signal, and configured to use the first reference voltage as a reference value of the signal sampling unit based on the fourth sampling signal.

5. The circuit for sampling an imaging signal according to claim 4, wherein the signal sampling unit includes a third sampling switch and a second sampling capacitor, a first end of the third sampling switch is connected to the imaging signal, a second end of the third sampling switch is connected to a first end of the second sampling capacitor, and a control end of the third sampling switch is connected to the third sampling signal; and the second reference unit includes a fourth sampling switch, a first end of the fourth sampling switch is connected to a second end of the second sampling capacitor, a second end of the fourth sampling switch is connected to the first reference voltage, and a control end of the fourth sampling switch is connected to the fourth sampling signal.

6. The circuit for sampling an imaging signal according to claim 5, wherein the amplification module includes a differential processing unit and an amplification unit;

the differential processing unit is connected to the 2N−1 differential connection signals and the first amplifying signal and configured to connect the 2N reset voltages and the 2N signal voltages in a one-to-one correspondence under the control of the 2N−1 differential connection signals and the first amplifying signal to obtain 2N−1 differential signals;

the amplification unit is connected to the differential processing unit, the second amplifying signal, and the reset signal;

when the reset signal controls the amplification unit to perform a reset operation, the first sampling module or the second sampling module is synchronously controlled to sample the imaging signal; and after sampling is completed, under the control of the second amplifying signal, the 2N−1 differential signals are amplified sequentially to obtain the 2N−1 sampling signals.

7. The circuit for sampling an imaging signal according to claim 6, wherein the differential processing unit includes 2N−1 differential connection switches, a first amplifying switch, and a second amplifying switch; and a first end of an ith differential connection switch is connected to a first end of an ith first sampling capacitor, a second end of the ith first sampling capacitor is connected to a first end of the first amplifying switch, a second end of the ith differential connection switch is connected to a first end of an ith second sampling capacitor, a second end of the ith second sampling capacitor is connected to a first end of the second amplifying switch, a control end of the ith differential connection switch is connected to an ith differential connection signal, a control end of the first amplifying switch and a control end of the second amplifying switch are connected to the first amplifying signal, a second end of the first amplifying switch is a first output end of the differential processing unit, and a second end of the second amplifying switch is a second output end of the differential processing unit.

8. The circuit for sampling an imaging signal according to claim 7, wherein the amplification unit includes a first reset switch, a second reset switch, a third reset switch, a fourth reset switch, a fifth reset switch, a sixth reset switch, a third amplifying switch, a fourth amplifying switch, a fifth amplifying switch, a sixth amplifying switch, a first feedback capacitor, a second feedback capacitor, and an operational amplifier;

a first end of the first reset switch is connected to a non-inverting input end of the operational amplifier, a second end of the first reset switch is connected to an inverting input end of the operational amplifier, the non-inverting input end of the operational amplifier is connected to an inverting output end of the operational amplifier via the third amplifying switch, the first feedback capacitor, and the fourth amplifying switch connected in series sequentially, the inverting input end of the operational amplifier is connected to a non-inverting output end of the operational amplifier via the fifth amplifying switch, the second feedback capacitor, and the sixth amplifying switch connected in series sequentially, the inverting output end of the operational amplifier is connected to the non-inverting output end of the operational amplifier via the second reset switch connected in series;

the second reference voltage is connected to a first end of the first feedback capacitor via the third reset switch connected in series, the third reference voltage is connected to a second end of the first feedback capacitor via the fourth reset switch connected in series, the second reference voltage is connected to a first end of the second feedback capacitor via the fifth reset switch connected in series, the fourth reference voltage is connected to a second end of the second feedback capacitor via the sixth reset switch connected in series;

a control end of the first reset switch, a control end of the second reset switch, a control end of the third reset switch, a control end of the fourth reset switch, a control end of the fifth reset switch, and a control end of the sixth reset switch are connected to the reset signal; and a control end of the third amplifying switch, a control end of the fourth amplifying switch, a control end of the fifth amplifying switch, and a control end of the sixth amplifying switch are connected to the second amplifying signal; and the non-inverting input end of the operational amplifier is connected to the first output end of the differential processing unit, the inverting input end of the operational amplifier is connected to the second output end of the differential processing unit, and the non-inverting output end of the operational amplifier and the inverting output end of the operational amplifier cooperate to output the sampling signal.

9. A method for sampling an imaging signal, applied to a circuit for sampling an imaging signal, wherein the circuit comprises:

a first sampling module connected to the imaging signal, a first reference voltage, N first sampling signals, and a second sampling signal, and configured to sample the imaging signal N times based on the first reference voltage under a control of the N first sampling signals and the second sampling signal to obtain 2N reset voltages;

a second sampling module connected to the imaging signal, the first reference voltage, N third sampling signals, and a fourth sampling signal, and configured to sample the imaging signal N times based on the first reference voltage under a control of the N third sampling signals and the fourth sampling signal to obtain 2N signal voltages; and an amplification module connected to the first sampling module, the second sampling module, 2N−1 differential connection signals, a first amplifying signal, a second amplifying signal, and a reset signal, wherein in each cycle of the imaging signal, the amplification module alternately performs a reset operation and a differential amplification process;

when the reset signal controls the amplification module to perform the reset operation, the first sampling module or the second sampling module is synchronously controlled to sample the imaging signal;

after sampling is completed, under a control of the 2N−1 differential connection signals, the first amplifying signal, and the second amplifying signal, the 2N reset voltages and the 2N signal voltages are differentially amplified 2N−1 times in sequence to obtain 2N−1 sampling signals;

during an ith amplification, an ith reset voltage and an ith signal voltage are differentially amplified to obtain an ith sampling signal; and i and N are integers, N≥2, and 1≤i≤2N−1, the method includes:

in a first half-cycle of the imaging signal, sampling the imaging signal N times, wherein each sampling is performed through M sampling capacitors to obtain M*N reset voltages;

in a second half-cycle of the imaging signal, sampling the imaging signal N times, wherein each sampling is performed through M sampling capacitors to obtain M*N signal voltages; and in each cycle including the first half-cycle and the second half-cycle, performing a reset operation and a differential amplification processing alternately, wherein 2N samplings are performed sequentially and synchronously with at least part of the reset operation;

the M*N reset voltages and the M*N signal voltages are differentially amplified M*N−1 times to obtain M*N−1 sampling signals;

in a tth differential amplification, a tth reset voltage and a tth signal voltage are differentially amplified to obtain a tth sampling signal; and t, N, and M are integers, N≥2, M≥2, and 1≤t≤M*N−1.

10. The method for sampling an imaging signal according to claim 9, wherein the first sampling module includes 2N reset sampling units and a first reference unit;

the reset sampling unit is connected to the first sampling signal and configured to sample the imaging signal based on the first sampling signal to obtain the reset voltage; and the first reference unit is connected to the reset sampling unit, the first reference voltage, and the second sampling signal, and configured to use the first reference voltage as a reference value of the reset sampling unit based on the second sampling signal.

11. The method for sampling an imaging signal according to claim 10, wherein the reset sampling unit includes a first sampling switch and a first sampling capacitor, a first end of the first sampling switch is connected to the imaging signal, a second end of the first sampling switch is connected to a first end of the first sampling capacitor, and a control end of the first sampling switch is connected to the first sampling signal; and the first reference unit includes a second sampling switch, a first end of the second sampling switch is connected to a second end of the first sampling capacitor, a second end of the second sampling switch is connected to the first reference voltage, and a control end of the second sampling switch is connected to the second sampling signal.

12. The method for sampling an imaging signal according to claim 11, wherein the second sampling module includes 2N signal sampling units and a second reference unit;

the signal sampling unit is connected to a third sampling signal and configured to sample the imaging signal based on the third sampling signal to obtain the signal voltage; and the second reference unit is connected to the signal sampling unit, the first reference voltage, and the fourth sampling signal, and configured to use the first reference voltage as a reference value of the signal sampling unit based on the fourth sampling signal.

13. The method for sampling an imaging signal according to claim 12, wherein the signal sampling unit includes a third sampling switch and a second sampling capacitor, a first end of the third sampling switch is connected to the imaging signal, a second end of the third sampling switch is connected to a first end of the second sampling capacitor, and a control end of the third sampling switch is connected to the third sampling signal; and the second reference unit includes a fourth sampling switch, a first end of the fourth sampling switch is connected to a second end of the second sampling capacitor, a second end of the fourth sampling switch is connected to the first reference voltage, and a control end of the fourth sampling switch is connected to the fourth sampling signal.

14. The method for sampling an imaging signal according to claim 13, wherein the amplification module includes a differential processing unit and an amplification unit;

the differential processing unit is connected to 2N−1 differential connection signals and the first amplifying signal and configured to connect 2N reset voltages and 2N signal voltages in a one-to-one correspondence under the control of the 2N−1 differential connection signals and the first amplifying signal to obtain 2N−1 differential signals;

the amplification unit is connected to the differential processing unit, the second amplifying signal, and the reset signal;

when the reset signal controls the amplification unit to perform a reset operation, the first sampling module or the second sampling module is synchronously controlled to sample the imaging signal; and after the sampling is completed, under the control of the second amplifying signal, the 2N−1 differential signals are amplified sequentially to obtain 2N−1 sampling signals.

15. The method for sampling an imaging signal according to claim 14, wherein the differential processing unit includes 2N−1 differential connection switches, a first amplifying switch, and a second amplifying switch; and a first end of the ith differential connection switch is connected to a first end of the ith first sampling capacitor, a second end of the ith first sampling capacitor is connected to a first end of the first amplifying switch, a second end of the ith differential connection switch is connected to a first end of the ith second sampling capacitor, a second end of the ith second sampling capacitor is connected to a first end of the second amplifying switch, a control end of the ith differential connection switch is connected to the ith differential connection signal, a control end of the first amplifying switch and a control end of the second amplifying switch are connected to the first amplifying signal, a second end of the first amplifying switch is a first output end of the differential processing unit, and a second end of the second amplifying switch is a second output end of the differential processing unit.

16. The method for sampling an imaging signal according to claim 15, wherein the amplification unit includes a first reset switch, a second reset switch, a third reset switch, a fourth reset switch, a fifth reset switch, a sixth reset switch, a third amplifying switch, a fourth amplifying switch, a fifth amplifying switch, a sixth amplifying switch, a first feedback capacitor, a second feedback capacitor, and an operational amplifier;

a first end of the first reset switch is connected to a non-inverting input end of the operational amplifier, a second end of the first reset switch is connected to an inverting input end of the operational amplifier, the non-inverting input end of the operational amplifier is connected to an inverting output end of the operational amplifier via the third amplifying switch, the first feedback capacitor, and the fourth amplifying switch connected in series sequentially, the inverting input end of the operational amplifier is connected to a non-inverting output end of the operational amplifier via the fifth amplifying switch, the second feedback capacitor, and the sixth amplifying switch connected in series sequentially, the inverting output end of the operational amplifier is connected to the non-inverting output end of the operational amplifier via the second reset switch connected in series;

the second reference voltage is connected to a first end of the first feedback capacitor via the third reset switch connected in series, the third reference voltage is connected to a second end of the first feedback capacitor via the fourth reset switch connected in series, the second reference voltage is connected to a first end of the second feedback capacitor via the fifth reset switch connected in series, the fourth reference voltage is connected to a second end of the second feedback capacitor via the sixth reset switch connected in series;

a control end of the first reset switch, a control end of the second reset switch, a control end of the third reset switch, a control end of the fourth reset switch, a control end of the fifth reset switch, and a control end of the sixth reset switch are connected to the reset signal; and a control end of the third amplifying switch, a control end of the fourth amplifying switch, a control end of the fifth amplifying switch, and a control end of the sixth amplifying switch are connected to the second amplifying signal; and the non-inverting input end of the operational amplifier is connected to the first output end of the differential processing unit, the inverting input end of the operational amplifier is connected to the second output end of the differential processing unit, and the non-inverting output end of the operational amplifier and the inverting output end of the operational amplifier cooperate to output the sampling signal.

* * * * *